US012551398B2

(12) United States Patent
Wang

(10) Patent No.: US 12,551,398 B2
(45) Date of Patent: Feb. 17, 2026

(54) SEXUAL STIMULATION DEVICE

(71) Applicant: Dongguan Mimao Electronic Technology Co., Ltd., Guangdong (CN)

(72) Inventor: Qinling Wang, Guangdong (CN)

(73) Assignee: Dongguan Mimao Electronic Technology Co., Ltd., Guangdong (CN)

( * ) Notice: Subject to any disclaimer, the term of this patent is extended or adjusted under 35 U.S.C. 154(b) by 0 days.

(21) Appl. No.: 18/978,239

(22) Filed: Dec. 12, 2024

(65) Prior Publication Data

US 2025/0248889 A1 Aug. 7, 2025

(30) Foreign Application Priority Data

Feb. 2, 2024 (CN) ......................... 202420269198.2
Jul. 25, 2024 (CN) ......................... 202421779259.6
Jul. 25, 2024 (CN) ......................... 202421779272.1
Jul. 25, 2024 (CN) ......................... 202421779281.0
Jul. 25, 2024 (CN) ......................... 202421779288.2

(51) Int. Cl.
*A61H 19/00* (2006.01)

(52) U.S. Cl.
CPC ......... *A61H 19/44* (2013.01); *A61H 2201/50* (2013.01)

(58) Field of Classification Search
CPC ........ A61H 19/00; A61H 19/40; A61H 19/44; A61H 19/50; A61H 19/30; A61H 19/34; A61H 2201/50; A61H 21/00
See application file for complete search history.

(56) References Cited

U.S. PATENT DOCUMENTS 9,138,373 B2 * 9/2015 Caropelo ............... A61H 19/30
12,208,053 B1 * 1/2025 Liu ...................... A61H 23/006
2006/0141903 A1 * 6/2006 Gardos .................. A61H 19/44 446/490
2007/0149903 A1 * 6/2007 Nan ....................... A61H 19/44 601/72
2014/0323929 A1 * 10/2014 Iurchenko .............. A61H 19/40 601/46
2015/0141883 A1 * 5/2015 Wu ........................ A61H 19/50 601/80
2015/0182413 A1 * 7/2015 Guang ............... A61H 23/0263 601/46

(Continued)

*Primary Examiner* — Victoria Murphy
(74) *Attorney, Agent, or Firm* — ScienBiziP, P.C.

(57) ABSTRACT

A sexual stimulation device includes: a main body; an elongated arm configured to be placed in a vagina, the elongate arm connected to the main body and including a first stimulation portion arranged at a distal end of the elongated arm away from the main body, the first stimulating portion configured for stimulating a first region; a second stimulation portion configured for stimulating a second region, the second region being different from the first region; and a third stimulation portion configured for stimulating a third region. The third region is different from the first stimulating region and the second stimulating region, the second stimulation portion and the third stimulation portion are respectively arranged at opposite sides of the elongated arm, a length of the second stimulation portion and a length of the third stimulation portion are shorter than a length of the elongated arm.

11 Claims, 28 Drawing Sheets

(56) References Cited

U.S. PATENT DOCUMENTS

| | | | | |
|---|---|---|---|---|
| 2016/0051438 | A1* | 2/2016 | Hahr | A61H 23/0263<br>601/72 |
| 2016/0120737 | A1* | 5/2016 | Sedic | A61H 23/0263<br>601/46 |
| 2016/0166466 | A1* | 6/2016 | Topolev | A61H 23/0263<br>601/46 |
| 2017/0100303 | A1* | 4/2017 | Kotlov | A61H 21/00 |
| 2018/0161236 | A1* | 6/2018 | Bailey | A61H 19/44 |
| 2024/0325240 | A1* | 10/2024 | Zhang | A61H 23/0254 |

* cited by examiner

SEXUAL STIMULATION DEVICE

RELATED APPLICATIONS

This application claims the benefit of priority to Chinese Patent Application Number 202420269198.2 filed on Feb. 2, 2024, Chinese Patent Application Number 202421779259.6 filed on Jul. 25, 2024, Chinese Patent Application Number 202421779272.1 filed on Jul. 25, 2024, Chinese Patent Application Number 202421779281.0 filed on Jul. 25, 2024, Chinese Patent Application Number 202421779288.2 filed on Jul. 25, 2024, in the China National Intellectual Property Administration. The entire contents of the above-identified application are hereby incorporated by reference.

TECHNICAL FIELD

The present disclosure relates to the technical field of sexual stimulation, in particular to a sexual stimulation device used for females.

BACKGROUND

With societal advancements, there's been a notable enhancement in living standards, leading to a heightened focus on the quality of sexual experiences. To cater to diverse sexual desires across different genders and anatomies, all kinds of sexual stimulation devices have been provided.

Currently, the majority of commercially available products are handheld stimulating devices. A handheld stimulating device may include a handle and a stimulating member coupled with the handle. These devices typically have special textures on outer surfaces, unique shapes, and/or vibration members to deliver effects. However, there are also many problems, such as only a single area is being stimulated, and/or only one mode of stimulation is available, which limits the ability of the devices to provide more comprehensive or enhanced pleasurable experiences.

BRIEF DESCRIPTION OF DRAWINGS

Implementations of the present disclosure will now be described, by way of embodiment, with reference to the attached figures.

DETAILED DESCRIPTION

Figure 1:
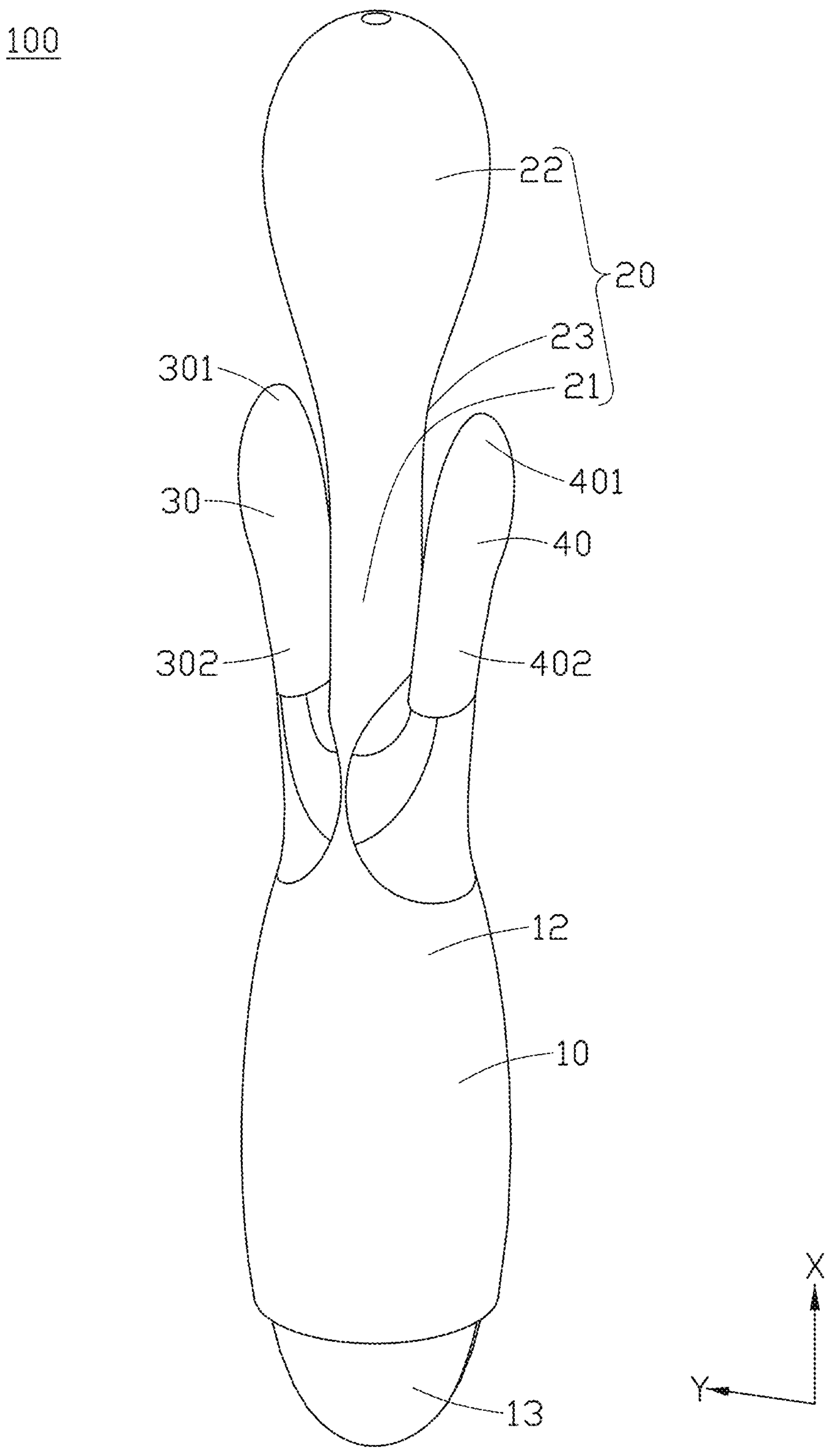
FIG. 1 is a three-dimensional structural diagram of a first embodiment of a sexual stimulation device according to the present disclosure.

Embodiments of the present disclosure will be described in detail hereinafter with reference to the accompanying drawings.

First Embodiment

Referring to FIG. 1 to FIG. 8 to illustrate the sexual stimulation device 100 of the present disclosure.

The present disclosure provides a sexual stimulation device 100, which is configured for being partly inserted into a vagina of a female for sexual stimulation. Specifically, the sexual stimulation device 100 includes a main body 10, an elongated arm 20 having a length direction which defines a longitudinal direction X of the sexual stimulation device 100, a pair of stimulation portions 30 and 40 symmetrical to each other, a driving mechanism 50, a first motor 60, a second motor 70, and a control circuit 101. The main body 10 may be shaped to be easily handheld by a user in use. The elongated arm 20 and the pair of stimulation portions 30 and

40 are directly coupled to a same end of the main body 10. Each of the elongated arm 20 and the stimulation portions 30 and 40 substantially extends along the longitudinal direction X of the sexual stimulation device 100. The driving mechanism 50 and the control circuit 101 are accommodated in the main body 10. The driving mechanism 50 is coupled to the elongated arm 20, the pair of stimulation portions 30 and 40, and the control circuit 101, therefore, under the control of the control circuit 101, the driving mechanism 50 is capable of driving the elongated arm 20 and the pair of stimulation portions 30 and 40 to do predefined motions. In this embodiment, the elongated arm 20 is driven to telescoping motions, and the stimulation portions 30 and 40 are driven to swing. In this embodiment, the elongated arm 20 and the pair of stimulation portions 30 and 40 are arranged along an arrange line which is parallel to a width direction of the elongated arm 20. The width direction of the elongated arm 20 also acts as a lateral direction Y of the sexual stimulation device 100. The pair of stimulation portions 30 and 40 includes a second stimulation portion 30 disposed at one side of the elongated arm 20 and a third stimulation portion 40 disposed at another side of the elongated arm 20 opposite to the one side of the elongated arm 20. The second stimulation portion 30, the elongated arm 20 and the third stimulation portion 40 at least partially overlap with one other in the lateral direction of the sexual stimulation device 100, while at least a part of the second stimulation portion 30, the elongated arm 20 and the third stimulation portion 40 are spaced from one another at a direction which is orthogonal to the arrange line.

In one embodiment, the elongated arm 10 is swingable in a first swing plane A perpendicular to the arranged line. The second stimulation portion 30 is configured to swing in a second swing plane B which is substantially parallel to the first swing plane A. The third stimulation portion 40 is configured to swing in a third swing plane C which is substantially parallel to the first swing plane A.

In one embodiment, the second stimulation portion 30 is capable of swinging in a second swing plane B which obliquely intersects with the first swing plane A. A first included angle $\alpha$ defined by the first swing plane A and the second swing plane B is in a range of 0-60 degrees. The third stimulation portion 40 is capable of swinging in a third swing plane C which obliquely intersects with the first swing plane A. A second included angle $\beta$ defined by the first swing plane A and the third swing plane C is in a range of 0-60 degrees. A third included angle $\gamma$ defined by the second swing plane B and the third swing plane C is in a range of 0-90 degrees.

The main body 10 includes a first accommodating portion 11 configured for accommodating the driving mechanism 50 and the control circuit 101. In the present embodiment, the main body 10 includes a first end 12 and a second end 13 arranged opposite to the first end 12. The first end 12 is a free end of the sexual stimulation device 100. The elongated arm 20, the second stimulation portion 30 and the third stimulation portion 40 are coupled to the first end 12 of the main body 10.

In this embodiment, the main body 10 is roughly elliptical in shape and has a handheld portion configured for being held by a hand of the female.

In addition, the main body 10 further includes a button (not shown), which is configured for controlling the control circuit 101 of the sexual stimulation device 100.

In the present embodiment, the elongated arm 20 is connected to the main body 10 and includes a connecting portion 21 extending from the first end 12 of the main body 10 and a first stimulation portion 22 extending from one end of the connecting portion 21 away from the main body 10. The first stimulation portion 22 is configured to stimulate a first region 201 of the female. When the elongated arm 20 is inserted into the vagina of the female, the elongated arm 20 can massage and stimulate the first region 201 of the vagina by the first stimulation portion 22, thereby obtaining a better sexual experience. Especially, compared to an opening of the vagina, the first region is much closer to a deepest side of the vagina.

In one embodiment, the length of the elongated arm 20 is in a range of 3 cm to 30 cm, which can be exemplified as 3 cm, 5 cm, 8 cm, 10 cm, 15 cm, 20 cm, 25 cm, 30 cm and the like, which is not limited herein.

Figure 6:
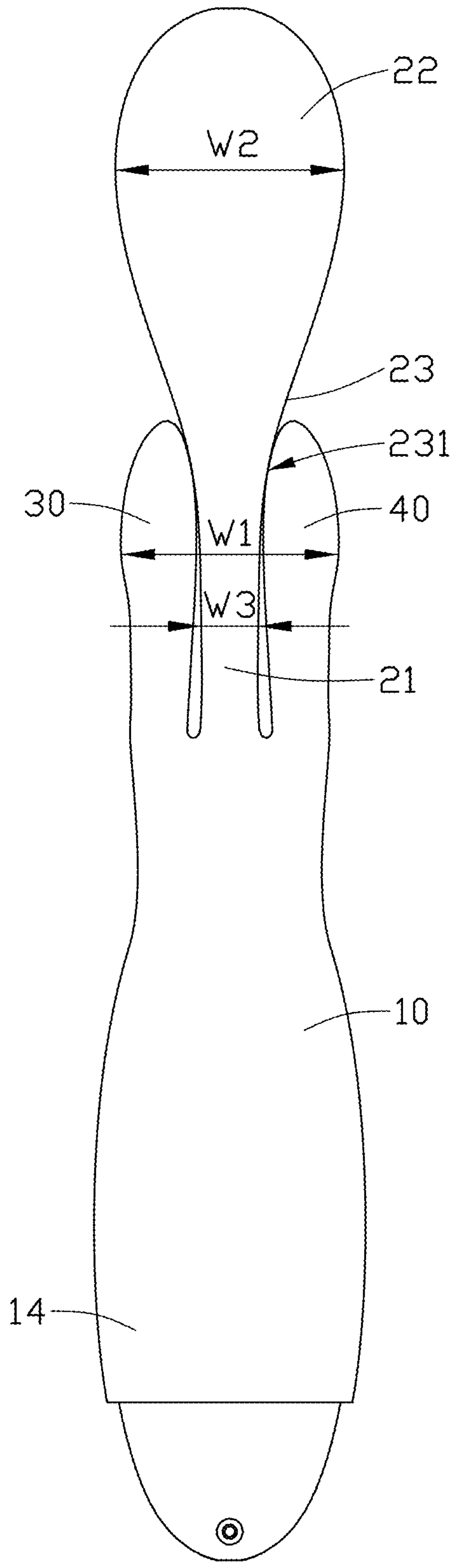
FIG. 6 illustrates a view of a second stimulation portion and a third stimulation portion of the sexual stimulation device shown in FIG. 1, the second and the third stimulation portions being attached to an inner wall of an object.
Figure 7:
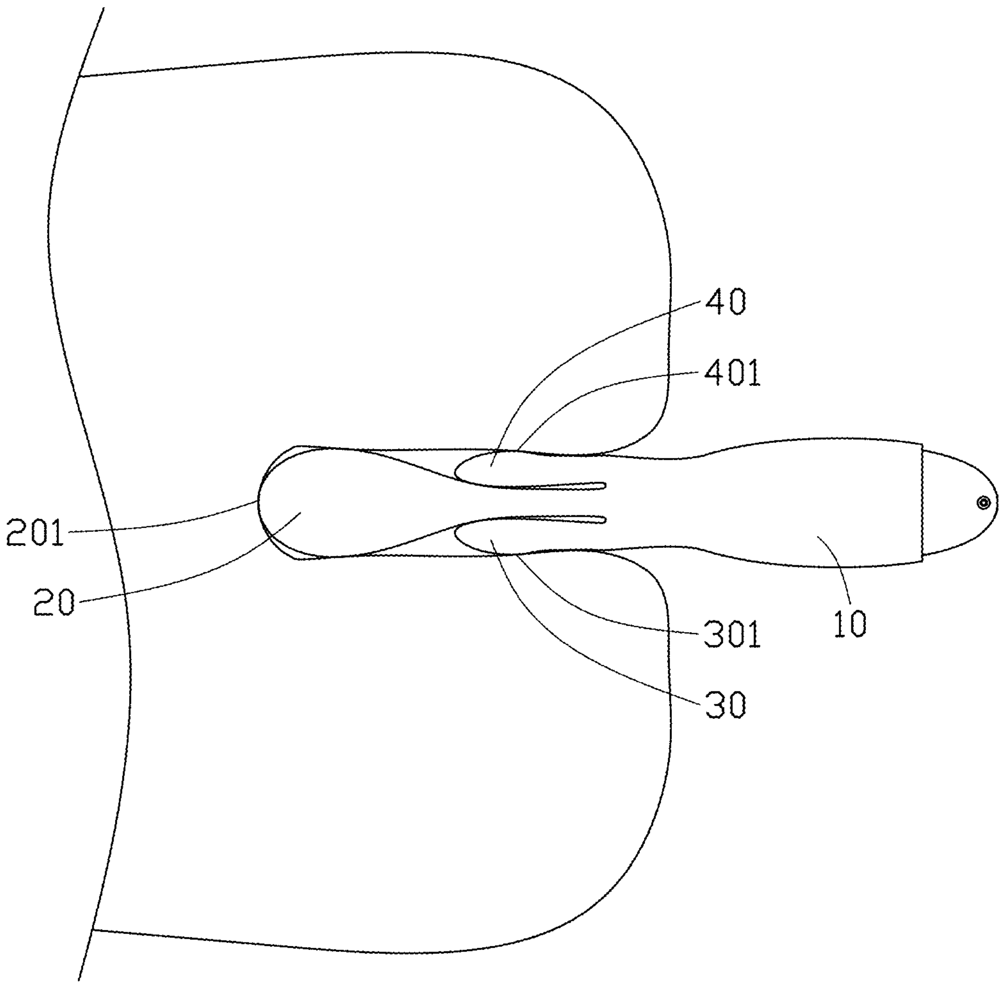
FIG. 7 is a schematic representation of a first state of the sexual stimulation device shown in FIG. 1.

In this embodiment, referring to FIG. 1 and FIG. 6, the connecting portion 21 comprises a neck portion 23 coupled to the main body 10, a width W1 of the neck portion 23 is much smaller than the width W2 of the first stimulation portion 22. The neck portion 23 comprising two concave portions 231 at on two opposite sides of the neck portion 23. The second stimulation portion 30 and the third stimulation portion 40 are disposed beside the two concave portions 231. In this embodiment, the second stimulation portion 30 and the third stimulation portion 40 are disposed at the two opposite sides of the neck portion 23 beside the concave portions 231. The sexual stimulation device 100 is switchable between an original state and a pressed state, in the pressed state, the second stimulation portion 30 and the third stimulation portion 40 are pressed towards the corresponding concave portions 231. In the original state, a maximum lateral width W3 from the second stimulation portion 30 to the third stimulation portion 40 is larger than the width W2 of the first stimulation portion 22. When the elongated arm 20 is being inserted into the vagina, the second stimulation portion 30 and the third stimulation portion 40 are pressed and at least partially accommodated in the corresponding concave portions 23, such that the second stimulation portion 30 and the third stimulation portion 40 are changed into the pressed state. In the pressed state, the maximum lateral width W3 from the second stimulation portion 30 to the third stimulation portion 40 is substantially equal to the width W2 of the first stimulation portion 22.

The elongated arm 20 further comprises a second accommodating portion 24 formed at the first stimulation portion 22 configured for accommodating the first motor 60. The first motor 60 drives the first stimulation portion 22 to move, such as vibration, rotation, extension, flowing, hollowing out and other different movements by control of the control circuit 101. When the elongated arm 20 is inserted into the vagina, the elongated arm 20 can further stimulate the first region 201 of the vagina of the female.

In the present embodiment, the first motor 60 is provided with a battery (not shown) configured to supply power to the first motor 60. The battery is also received in the second accommodating portion 24. Therefore, it is possible to effectively simplify the wiring inside the sexual stimulation device 100 and save space.

Referring to FIG. 5 to FIG. 8, each of the second stimulation portion 30 and the third stimulation portion 40 extend from the main body 10 along a direction parallel to or obliquely intersected with the longitudinal direction X of the sexual stimulation device 100. The second stimulation portion 30 and the third stimulation portion 40 are arranged at opposite sides of the elongated arm 20, a length of the second stimulation portion 30 and a length of the third stimulation portion 40 are much shorter than a length of the elongated arm 20, the second stimulation portion 30 is configured for stimulating a second region 301 of the female, the second region 301 is different from the first region 201, the third stimulation portion 40 is configured for stimulating a third region 401 of the female, the third region 301 is different from the first region 201 and the second region 301. The elongated arm 20 is arranged between the second region 301 and the third region 401.

In the present embodiment, a length of the elongated arm 20 is much greater than at least one of a length of the second stimulation portion 30 and a length of the third stimulation portion 40. For example, the length of the elongated arm 20 is more than twice of each of the lengths of the second stimulation portion 30 and the third stimulation portion 40. In the present embodiment, the lengths of the second stimulation portion 30 and the third stimulation portion 40 are in a range of ¼ to ½ of the length of the elongated arm 20.

Figure 8:
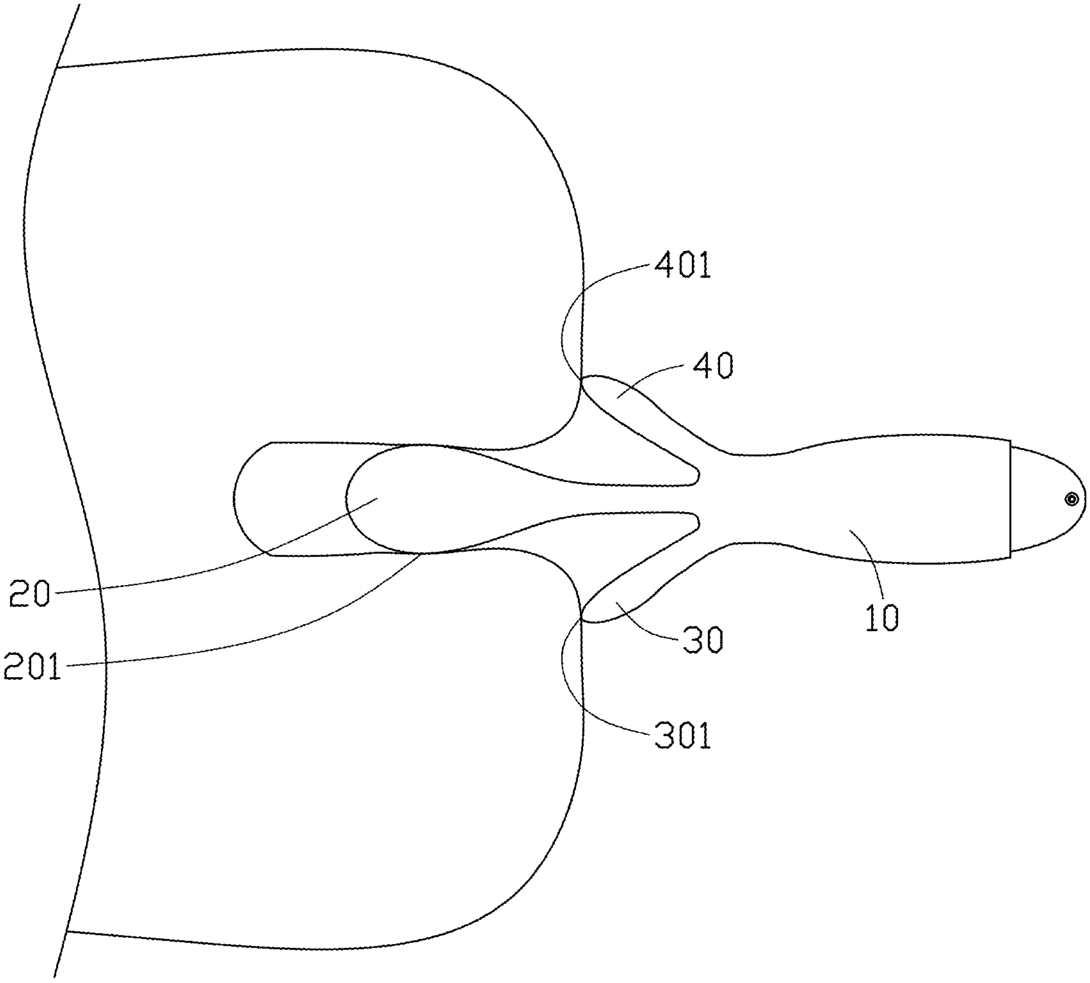
FIG. 8 is a schematic representation of a second state of the sexual stimulation device shown in FIG. 1.

An end of the elongated arm 20 that is most further away from the main body 10 relative to at least one end of the second and third stimulation portions 30,40 is insertable into a deep position inside the vagina, the at least one end of the second and third stimulation portions 30,40 is deposed at an area adjacent to an opening of the vagina. That is, the second region 301 and the third region 401 (shown in FIG. 7) are adjacent to the opening of the vagina, while the first region 201 is adjacent to the deepest area of the vagina. In a use circumstance, the elongated arm 20 inserts into the vagina to stimulate, the second stimulation portion 30 and the third stimulation portion 40 are also insert into the vagina together with the elongated arm 20. In this use circumstance, the second region 301 and the third region 401 are in the vagina of the female (shown in FIG. 7). In another using circumstance, the elongated arm 20 inserts into the body, the second stimulation portion 30 and the third stimulation portion 40 abut the periphery of the vagina. In this use circumstance, the second region 301 and the third region 401 are located at outside of the vagina (as shown in FIG. 8). Users can thus obtain a better massage stimulation effect.

In addition, the second stimulation portion 30 and the third stimulation portion 40 are configured to swing. The control circuit 10 is configured to cause the sexual stimulation device 100 to be in a first control mode or in a second control mode. in the first control mode, the second stimulation portion 30 and the third stimulation portion 40 swing at a same frequency in a same swing direction for a preset time period, in the second control mode, the second stimulation portion 30 and the third stimulation portion 40 swing at a same frequency in opposite swing directions for a preset time period.

In some embodiments, the second stimulation portion 30 and the third stimulation portion 40 are configured to swing reciprocally relative to the elongated arm 20 such that the second and the third stimulation portions 30,40 move closer to or further from the elongated arm 20. The second stimulation portion 30 and the third stimulation portion 40 can predefined to swing in a same direction at a certain time, such as, both of them swinging towards left, or predefined to swing in opposite directions at a certain time, such as, the second stimulation portion 30 swinging towards left while the third stimulation portion 40 swinging towards right.

In this embodiment, the second stimulation portion 30 and the third stimulation portion 40 are swingable along a thickness direction Z. Specifically, the second stimulation portion 30 and the third stimulation portion 40 are predefined to swing synchronously. The second stimulation portion 30 and the third stimulation portion 40 swing towards a same direction or opposite directions at a certain time.

In other embodiments, each of the second stimulation portion 30 and the third stimulation portion 40 includes a connecting end 301, 401 connecting with the main body 10 and a distal end 302, 402 away from the main body 10. The distal end 302, 402 is rotatable around a central axis thereof.

In addition, at least one of the distal ends 302, 402 of the second stimulation portion 30 and the third stimulation portion 40 is provided with the second motor 70. The second motor 70 is configured to drive the corresponding distal end 302, 402 to vibrate. In this way, the second/third stimulation portion 30/40 having the second motor 70 vibrate while swinging, thereby providing the user with a better experience.

In this embodiment, each of the second stimulation portion 30 and the third stimulation portion 40 is provided with the second motor 70. In the present embodiment, the second motor 70 is a vibration motor capable of generating vibrations in a high frequency.

In the present embodiment, the second motor 70 has a battery (not shown) in the distal end for supplying power to the second motor 70. Thereby effectively simplifying the wirings inside the sexual stimulation device 100.

In this embodiment, each of the second stimulation portion 30 and the third stimulation portion 40 has a roughly columnar structure.

Figure 2:
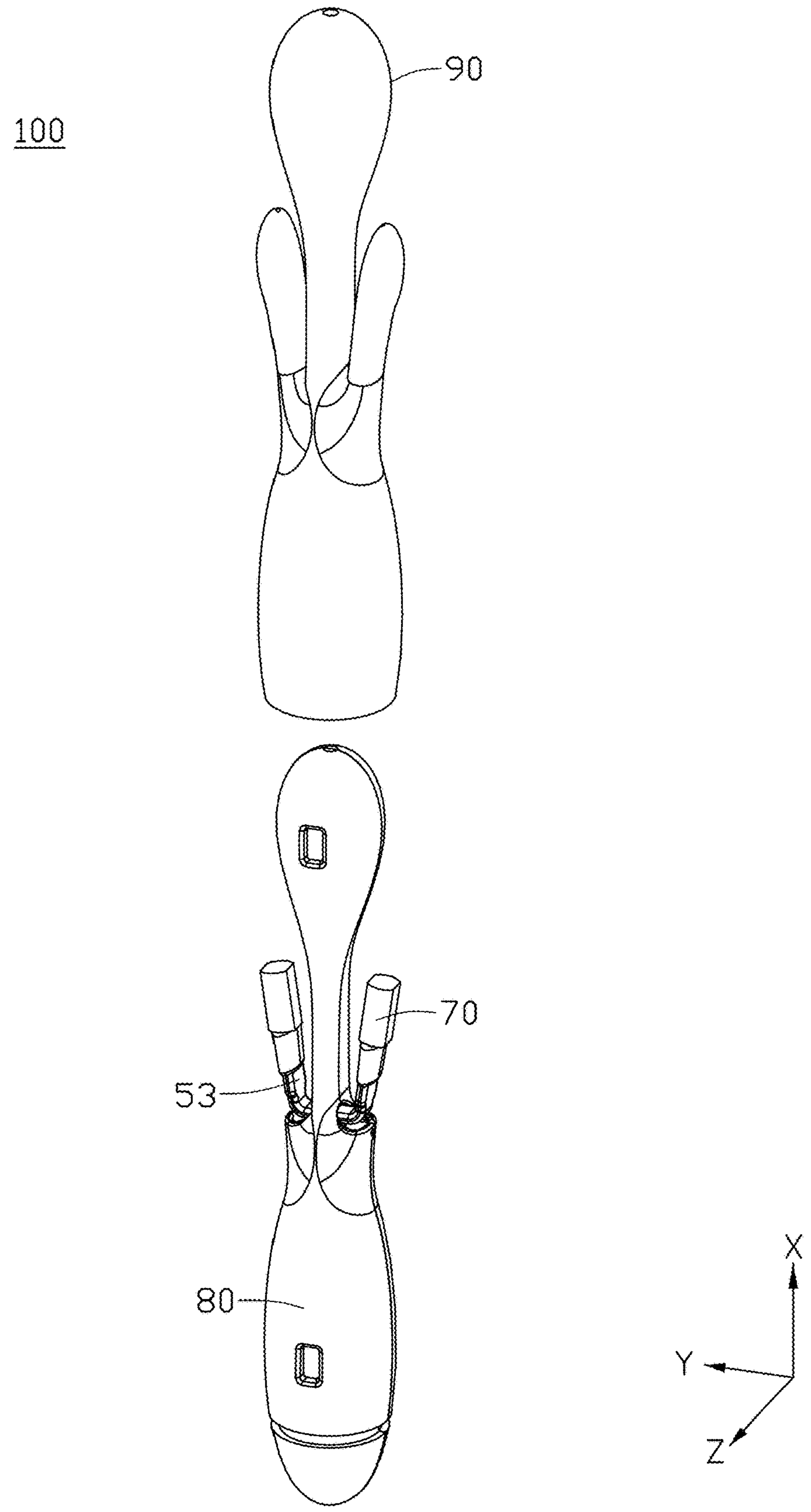
FIG. 2 is an exploded view of the sexual stimulation device shown in FIG. 1.
Figure 3:
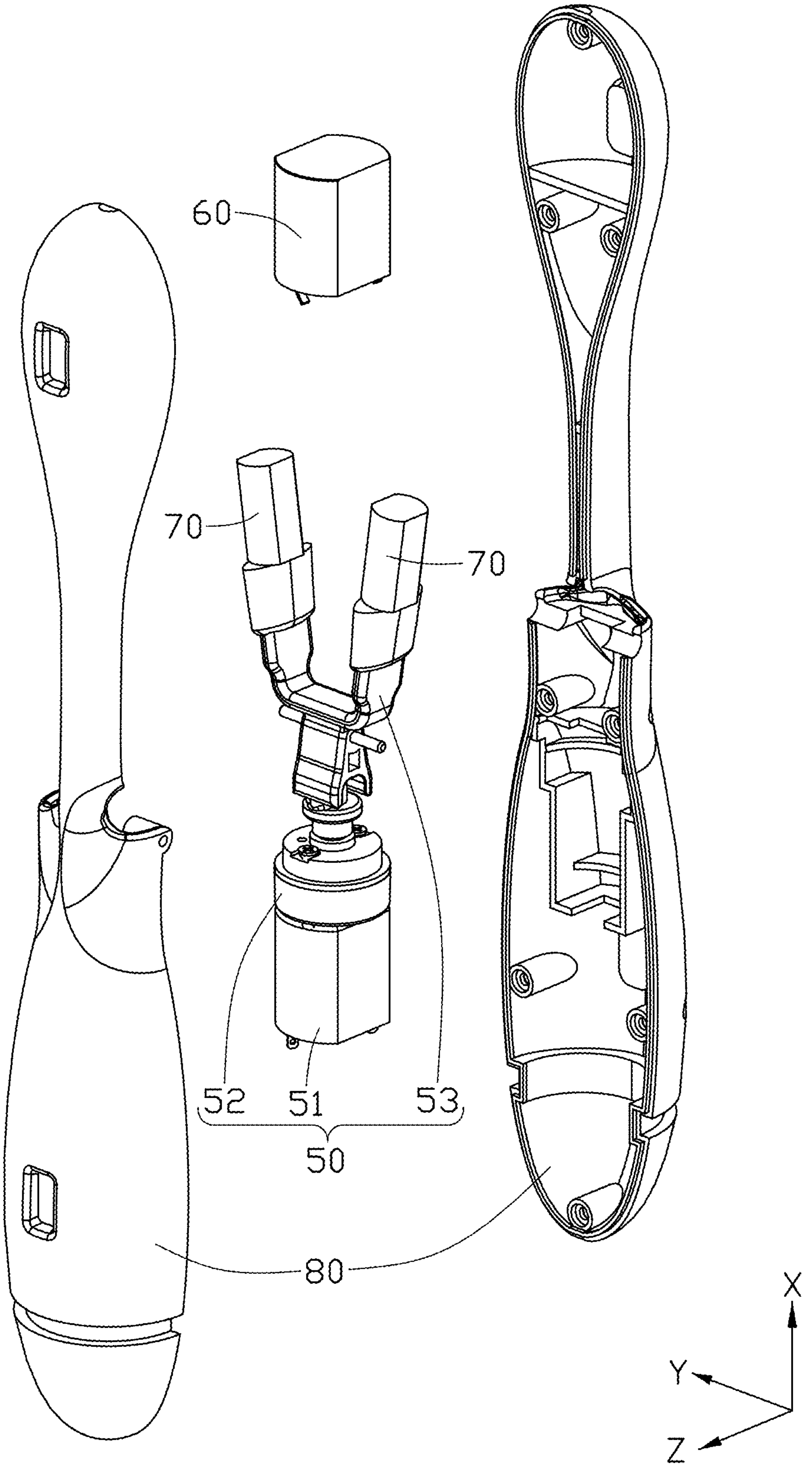
FIG. 3 is an exploded view of a partial structure of the sexual stimulation device shown in FIG. 2.
Figure 4:
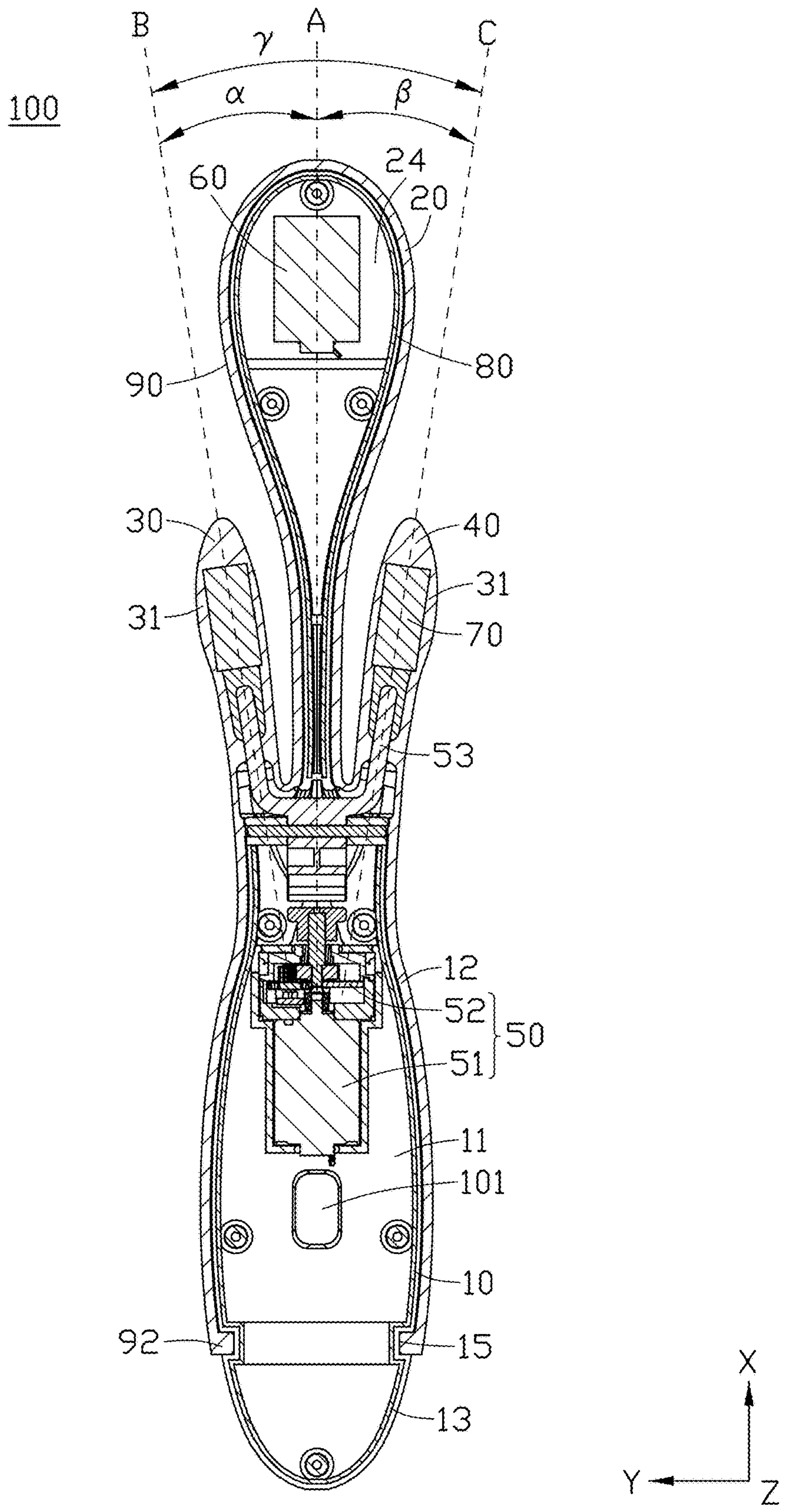
FIG. 4 is a sectional view of the sexual stimulation device shown in FIG. 1.
Figure 5:
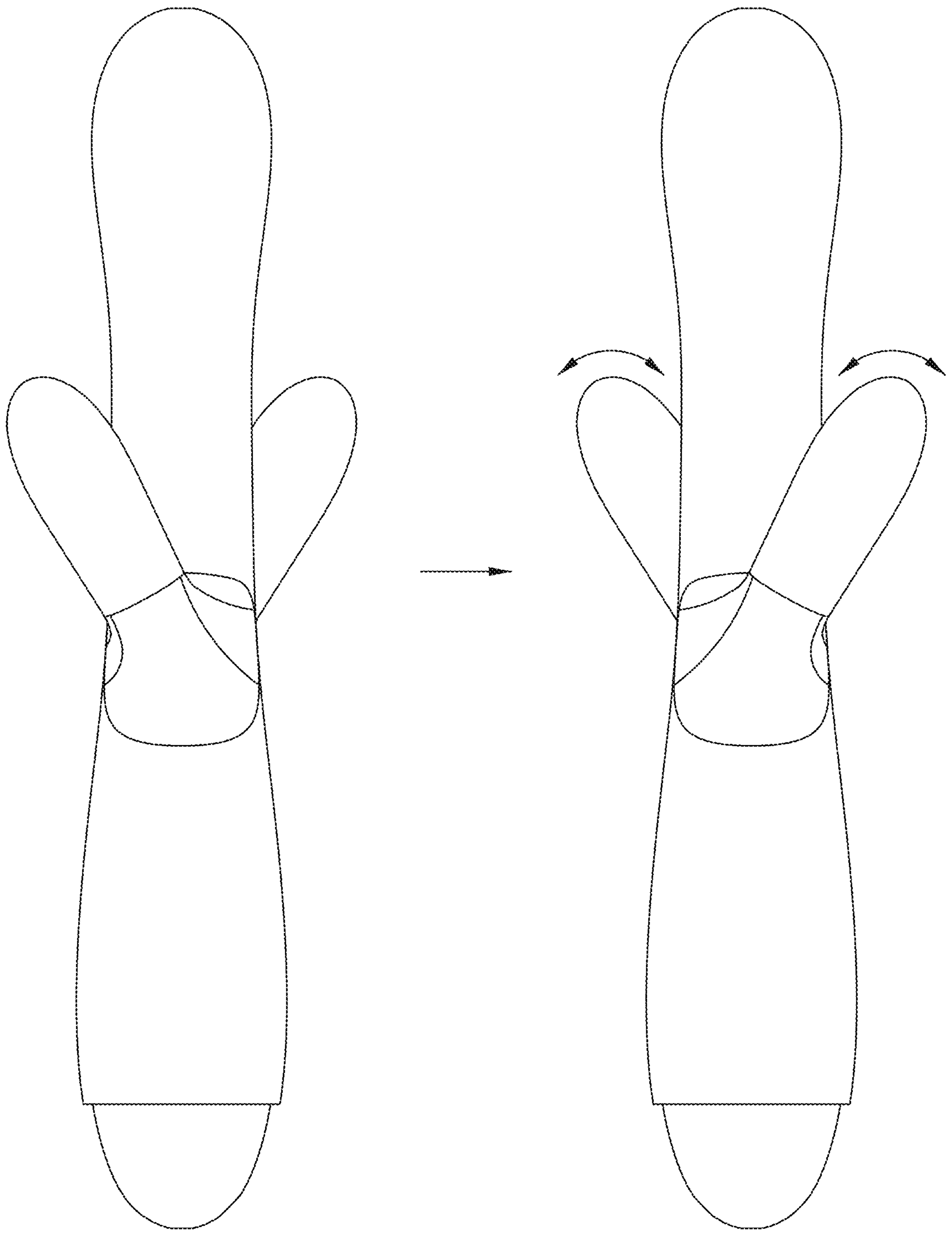
FIG. 5 is a schematic view illustrating the sexual stimulation device shown in FIG. 1, in a swinging state.

Referring to FIG. 2 to FIG. 4, the driving mechanism 50 includes a driving motor 51, a transmission 52 and two driver portions 53 arranged in the first accommodating portion 11. The driving motor 51 is connected to the transmission 52 configured for changing rotation speeds of the driving motor 51, thereby controlling the frequency of the elongated arm 20, the second stimulation portion 30 and the third stimulation portion 40. the two driver portions 53 are configured to drive the corresponding stimulation portion to move by the drive of the driving motor 51, one end of each of the two driver portions 53 engages with the transmission 52, and another end of each of the two driver portions 53 is inserted into corresponding one of the second stimulation portion 30 and third stimulation portion 40, so as to drive the second stimulation portion 30 and the third stimulation portion 40 to move by the drive of the driving motor 51.

In this way, by driving the second stimulation portion 30 and the third stimulation portion 40 to swing under the effect of one driving motor 51, thereby satisfying driving mechanisms 50.

The sexual stimulation device 100 further includes a cover member 90 having a hardness less than the two driver portions 53. In this embodiment, a portion of the cover member 90 corresponding to the elongated arm 20, the second stimulation portion 30 and/or the third stimulation portion 40 is seamless so as to provide one continuous skin-like surface that is smooth and soft.

In this embodiment, each of the second two stimulation portion 30 and the third stimulation portion 40 comprises the cover member 90 having a hardness less than a portion of the driving mechanism 50 which is connected to the second stimulation portion 30 and the third stimulation portion 40.

In the present embodiment, the second end 12 of the main body 10 is exposed from the cover member 90. In another words, an outer surface of the second end 12 of the main body 10 is not wrapped by the cover member 90. In other embodiments, the cover member 90 can also wrap the entire surface of the main body 10, which is not limited herein.

A recess 15 is formed in an outer surface of the main body 10 at a location adjacent to the second end 12. A protruding portion 92 is formed at an end of the cover member 90. The protruding portion 92 is received into the recess 15 to further prevent the cover member 90 from detaching from the main body 10.

In addition, the sexual stimulation device 100 further includes a shell 80 having a hardness larger than that of the cover member 90. At least one of the first accommodating portion 11 and the second accommodating portion 24 are defined by the shell 80. The cover member 90 covers the shell 80 at the second stimulation portion 30 and the third stimulation portion 40.

Second Embodiment

Figure 9:
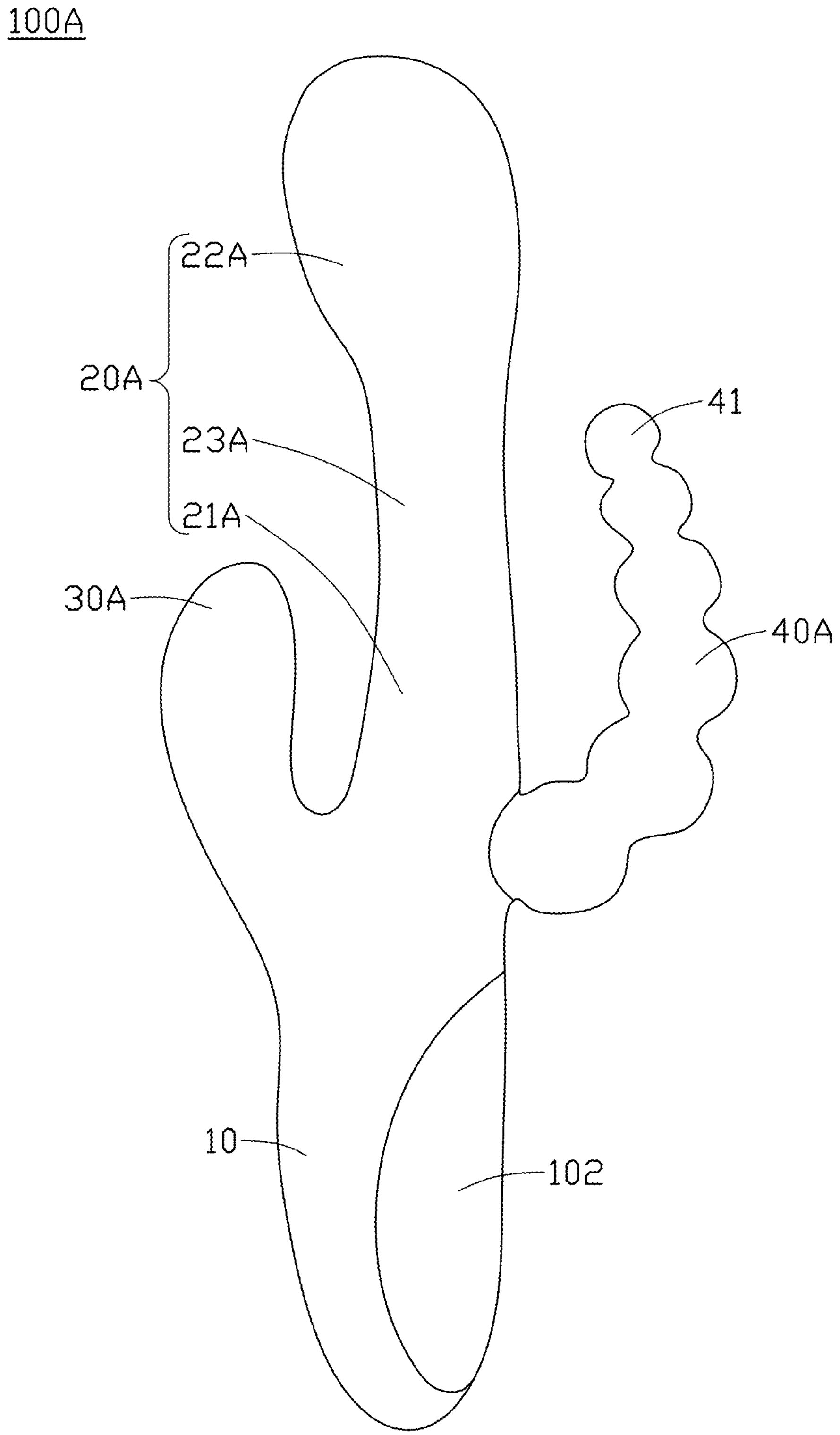
FIG. 9 is a three-dimensional structural diagram of a second embodiment of a sexual stimulation device according to the present disclosure.
Figure 10:
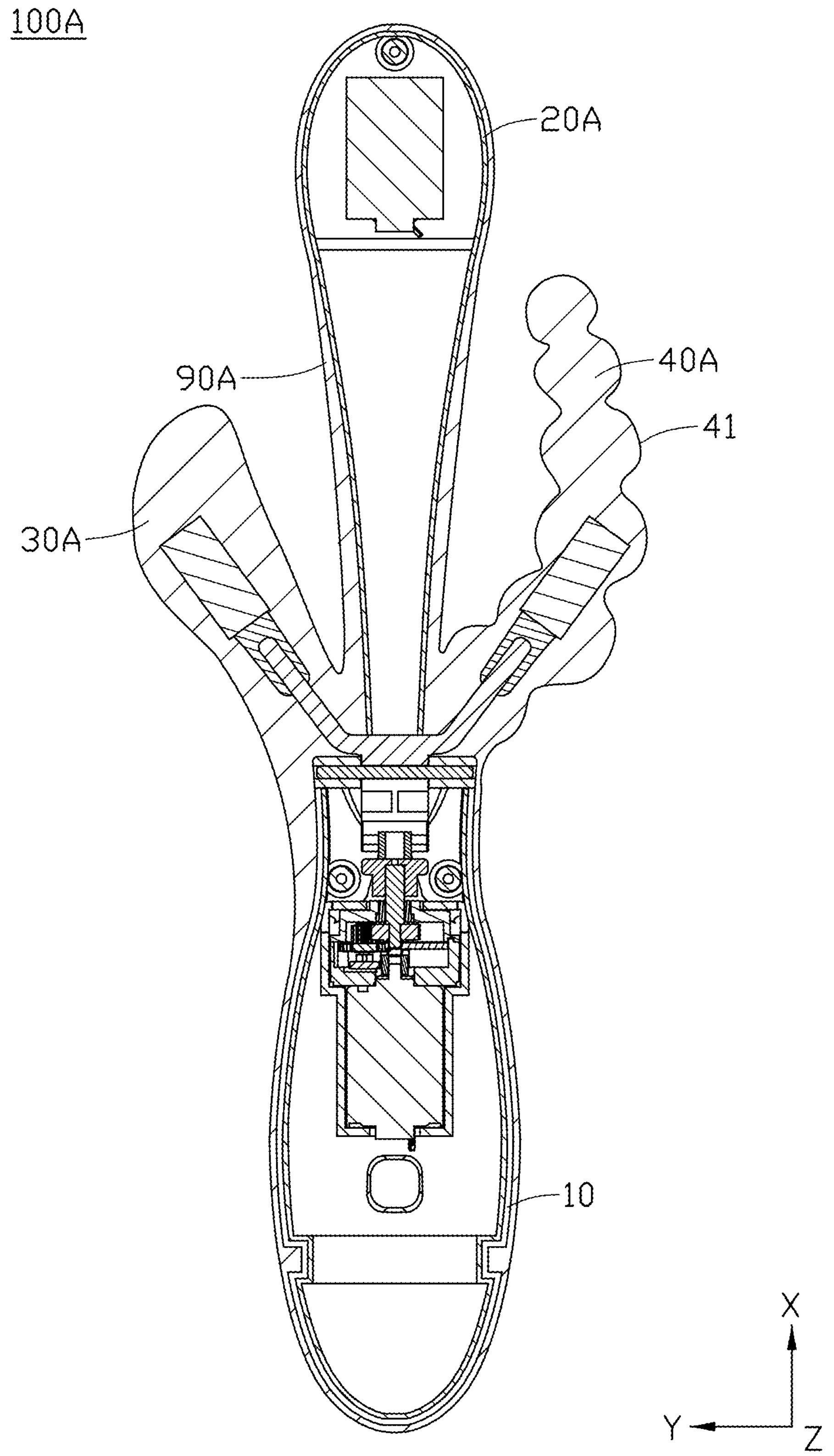
FIG. 10 is a sectional view of the sexual stimulation device shown in FIG. 9.
Figure 11:
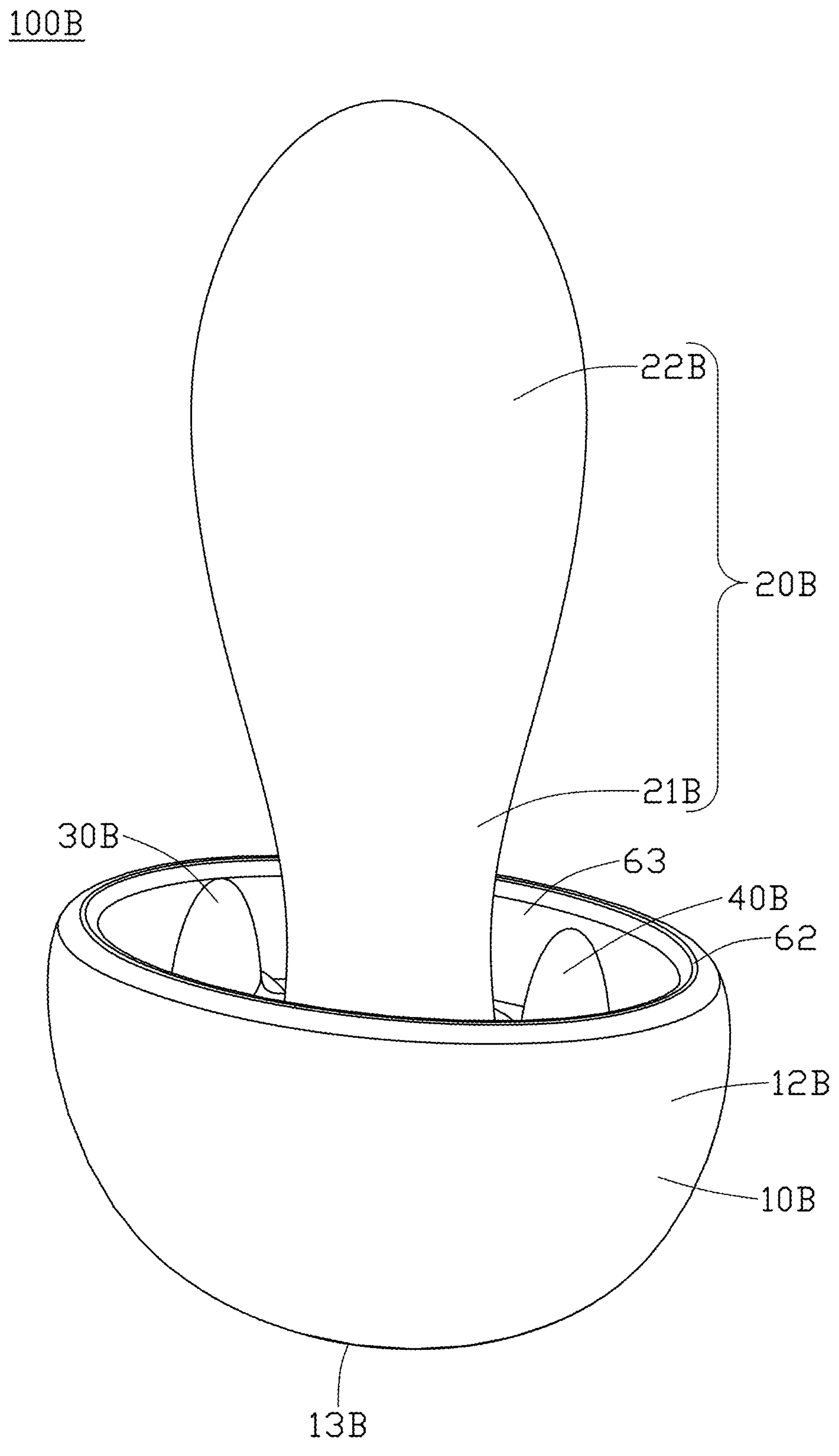
FIG. 11 is a three-dimensional structural diagram of a third embodiment of a sexual stimulation device according to the present disclosure.
Figure 12:
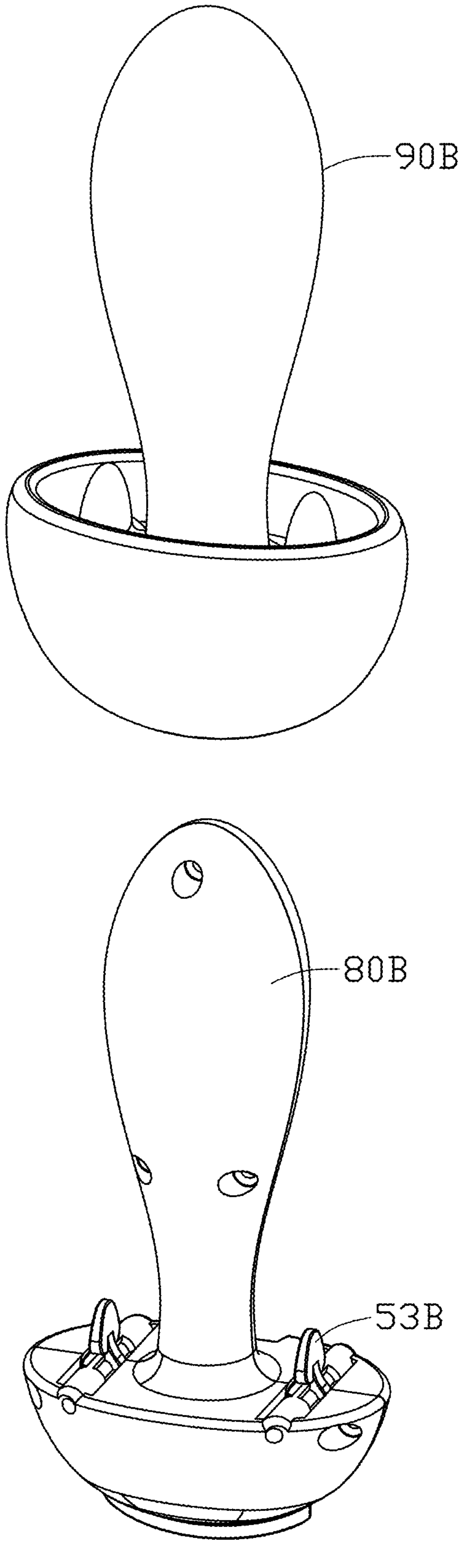
FIG. 12 is an exploded view of the sexual stimulation device shown in FIG. 11.
Figure 13:
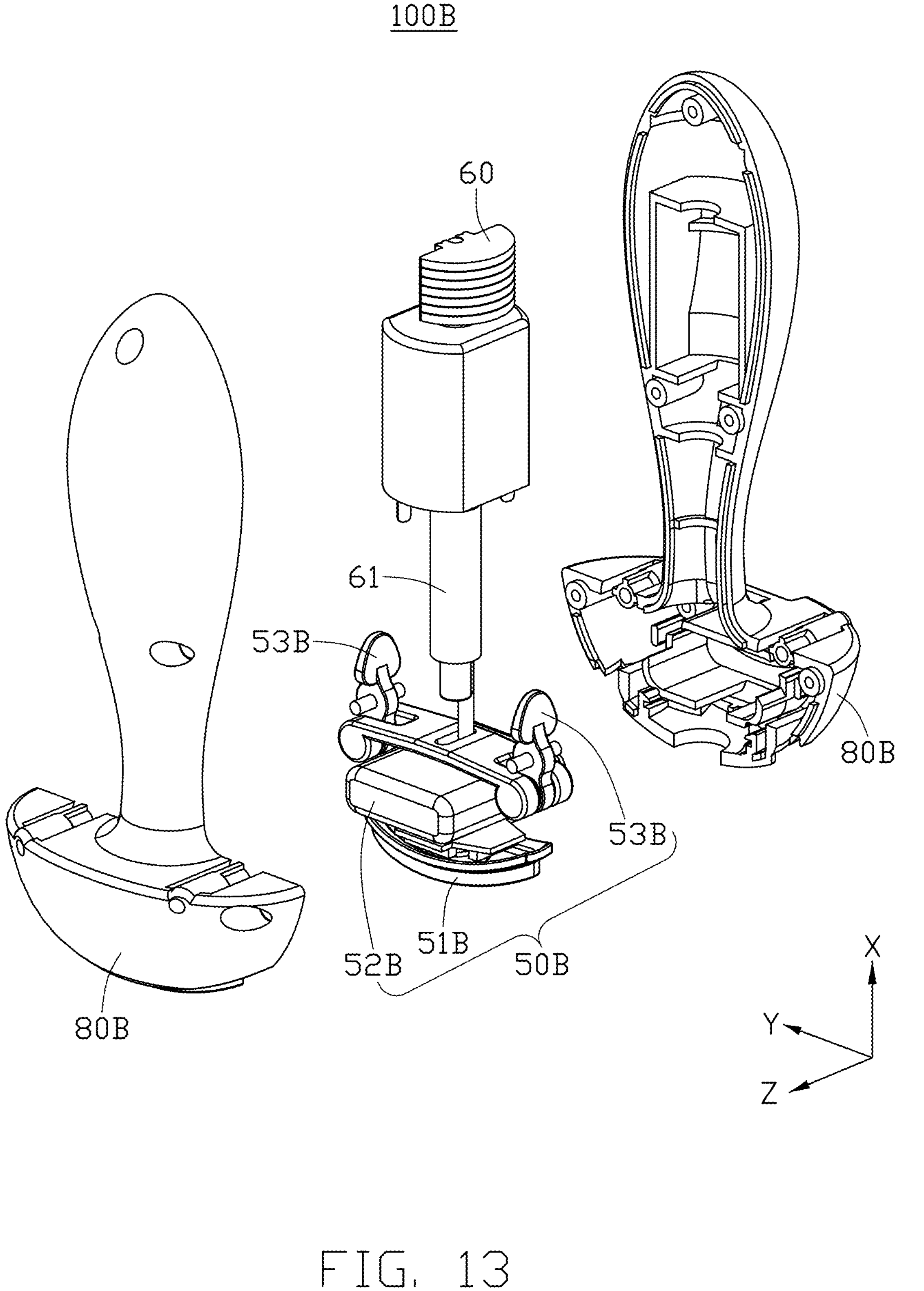
FIG. 13 is a sectional view of a partial structure of the sexual stimulation device shown in FIG. 12.
Figure 14:
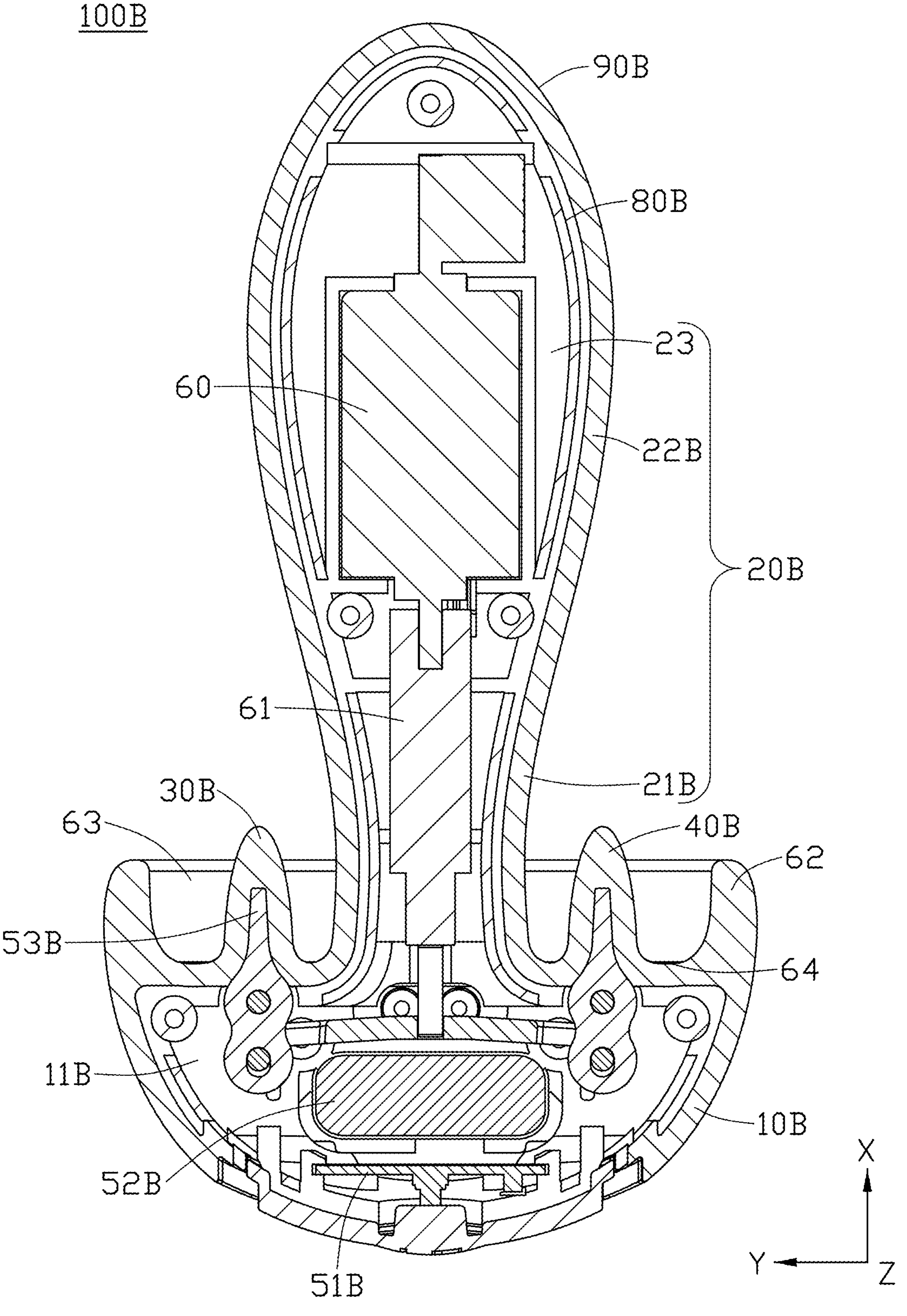
FIG. 14 is a sectional view of the sexual stimulation device shown in FIG. 11.

The second embodiment of the present disclosure will be illustrated below based on FIG. 9 and FIG. 10. In addition, for the convenience of illustration, the same reference numerals are marked for components with the same function as those described in the above embodiments, and their illustrations are omitted.

In the present embodiment, a connecting portion 21A of the elongated arm 20A of the sexual stimulation device 100B is roughly cylindrical. The size of the connecting portion 21A is slightly less than that of a first stimulation portion 22A. A neck portion 23A is formed between the connecting portion 21A and the first stimulation portion 22A.

A top end of the elongated arm 20A is higher than each one of a top end of the second stimulation portion 30A and the third stimulation portion 40A. The second stimulation portion 30A and the third stimulation portion 40A are asymmetrically arranged. The length of the second stimulation portion 30A is different to that of the third stimulation portion 40A.

In the present embodiment, the second stimulation portion 30A and the third stimulation portion 40A protrude from different positions, and the second stimulation portion 30A and the third stimulation portion 40A are bent, the end of the third stimulation portion 40A away from the main body 10A is closer to the elongated arm 20A than a middle portion of the third stimulation portion 40A.

Further, the third stimulation portion 40A includes a plurality of spherical portions 41 which are sequentially connected. The sizes of the plurality of spherical portions 41 are gradually decreased the side adjacent to the main body 10A.

In this embodiment, the main body 10A further comprises a decorative member 102 to improve the overall appearance of the sexual stimulation device 100A.

In this embodiment, the cover member 90A is arranged at the out surface of the sexual stimulation device 100A, except for the decorative member 102, to make the outer surface of the sexual stimulation device 100A soft and obtain a better experience.

Third Embodiment

The third embodiment of the present disclosure will be illustrated below based on FIG. 11 to FIG. 14. In addition, for the convenience of illustration, the same reference numerals are marked for components with the same function as those described in the above embodiments, and their illustrations are omitted.

In the present embodiment, the main body 10B of the sexual stimulation device 100B includes the first end 12B and the second end 13B arranged opposite to the first end 12B. The main body 10B may be hemispherical shape which has gradually decrease size from the first end 12B and the second end 13B.

The elongated arm 20B of the present embodiment may be roughly in a shape of a water droplet, and the maximum size of the first stimulation portion 22B is greater than the size of the connecting portion 21B.

The sexual stimulation device 100B of the present embodiment further includes a connecting rod 61 extending from the main body 10B to the elongated arm 20B for supporting the elongated arm 20B.

In the present embodiment, the second stimulation portion 30B and the third stimulation portion 40B are arranged on the first end 12B of the main body 10B, with a cross section being cone-shaped, and no motor is arranged inside the second stimulation portion 30B and the third stimulation portion 40B. The oscillations generated by the second stimulation portion 30B and the third stimulation portion 40B are caused by the driving effects of the driver portion 53B of the driving mechanism 50B.

In the present embodiment, the sexual stimulation device 100B further includes an edge portion 62 of the first end 12B of the main body 10B. The extension direction of the edge portion 62 is the same as the extension directions of the second stimulation portion 30B and the third stimulation portion 40B.

In this embodiment, the edge portion 62 extends along the side wall of the first end 12B of the main body 10B. The first ends 12B forms a groove 63, the elongated arm 20B, the second stimulation portion 30B and the third stimulation portion 40B extend from a bottom 64 of the groove 63.

In the present embodiment, a protrusion height of the edge portion 62 is less than a protrusion height of the second stimulation portion 30B and the third stimulation portion 40B. Therefore, the edge portion 62 will not hinder the movement of the elongated arm 20B, the second stimulation portion 30B and the third stimulation portion 40B. Herein, the protrusion height of the edge portion 62 refers to the length of the edge portion 62 extending from the end wall of the first end 12B of the main body 10B, while the protrusion heights of the second stimulation portion 30B and the third stimulation portion 40B refer to the length of the second stimulation portion 30B and the third stimulation portion 40B extending from the end wall of the first end 12B of the main body 10B.

The driving motor 51B, the transmission 52B, and the two driver portions 53B of the driving mechanism 50B are arranged in the first accommodating portion 11B, and their structures have been adjusted accordingly based on the appearance of the sexual stimulation device 100B. In addition, the cover member 90B is wrapped around the outer circumference of the shell 80B and the two driver portions 53B, that is, the cover member 90B is wrapped around the overall outer circumference of the sexual stimulation device 100B, thereby having better sealing performance.

Fourth Embodiment

Figure 15:
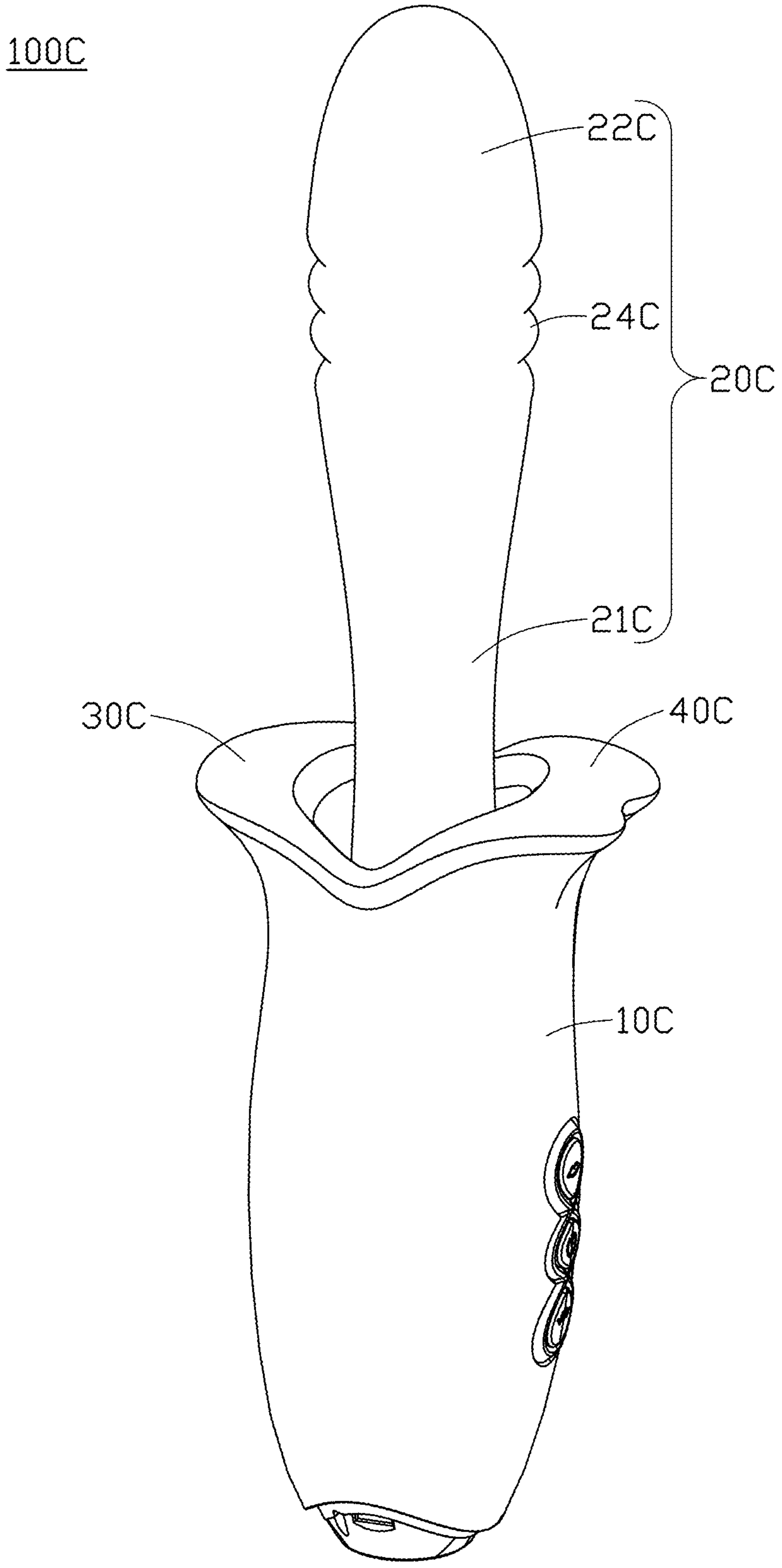
FIG. 15 is a three-dimensional structural diagram of a fourth embodiment of a sexual stimulation device according to the present disclosure.
Figure 16:
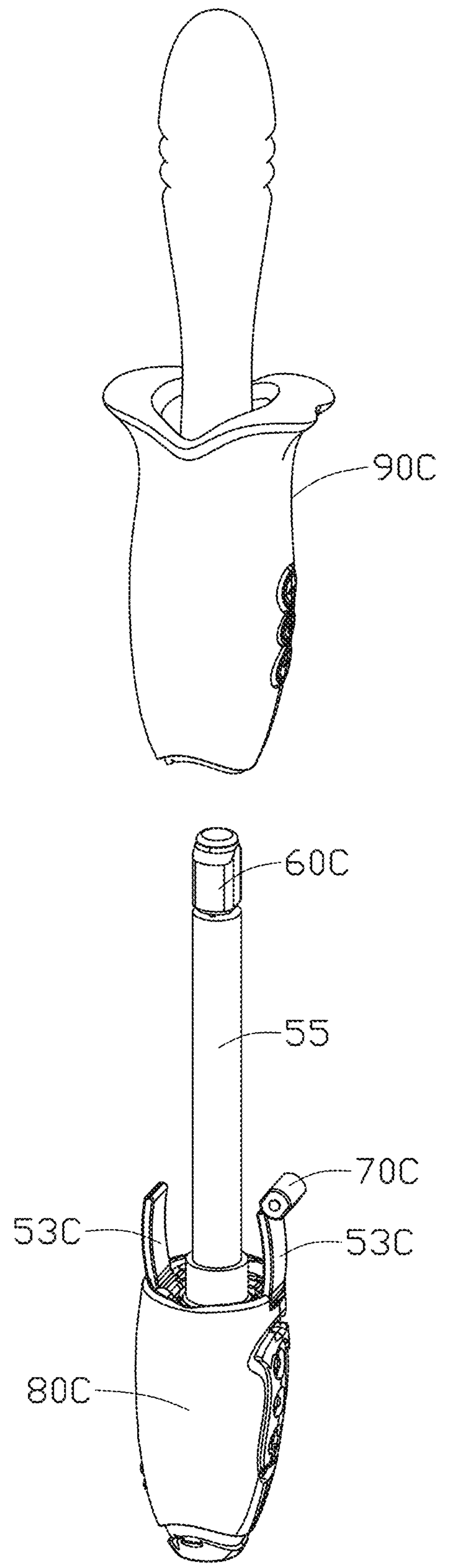
FIG. 16 is an exploded view of the sexual stimulation device shown in FIG. 15.
Figure 17:
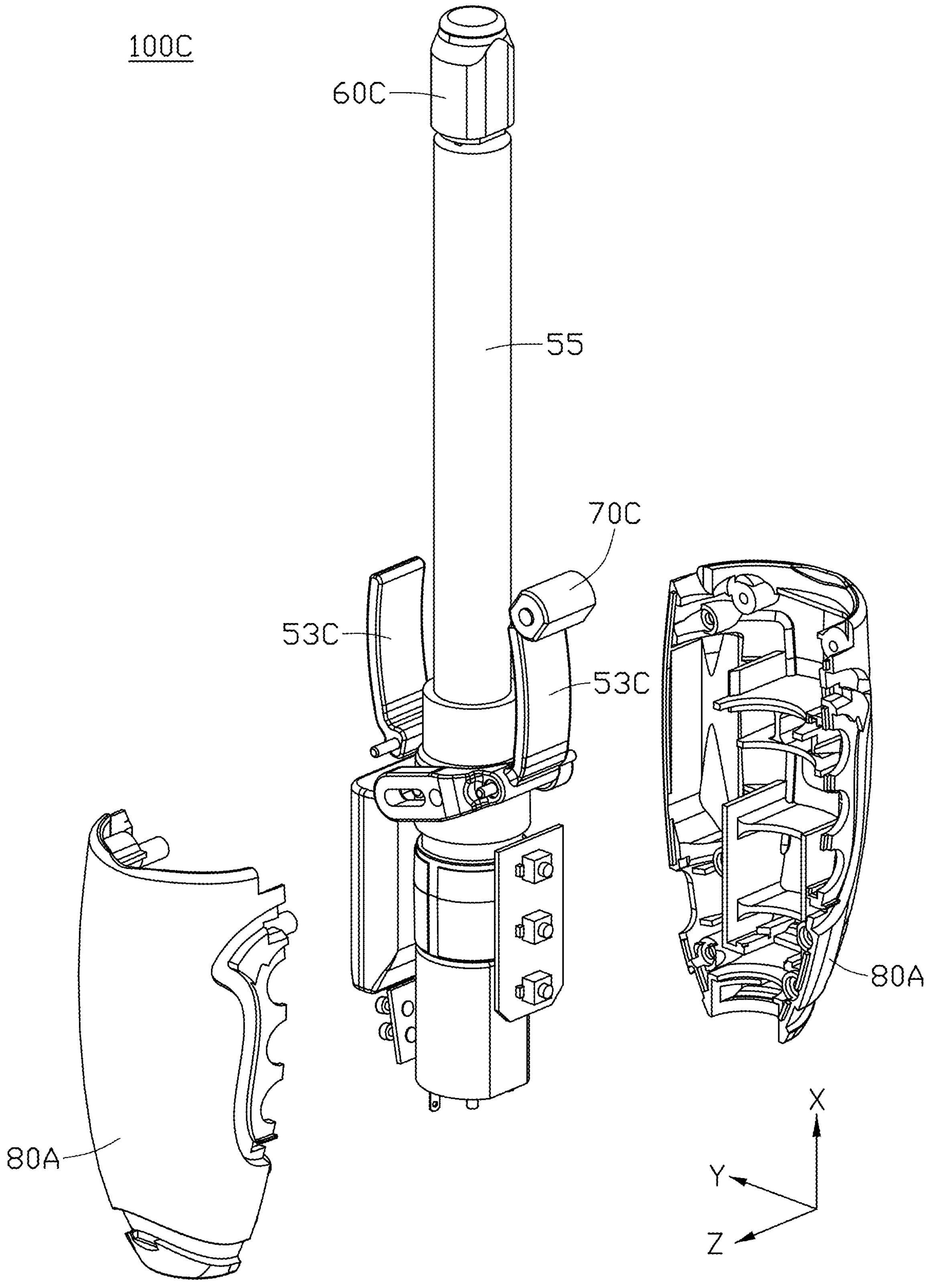
FIG. 17 is an exploded view of a partial structure of the sexual stimulation device shown in FIG. 16.
Figure 18:
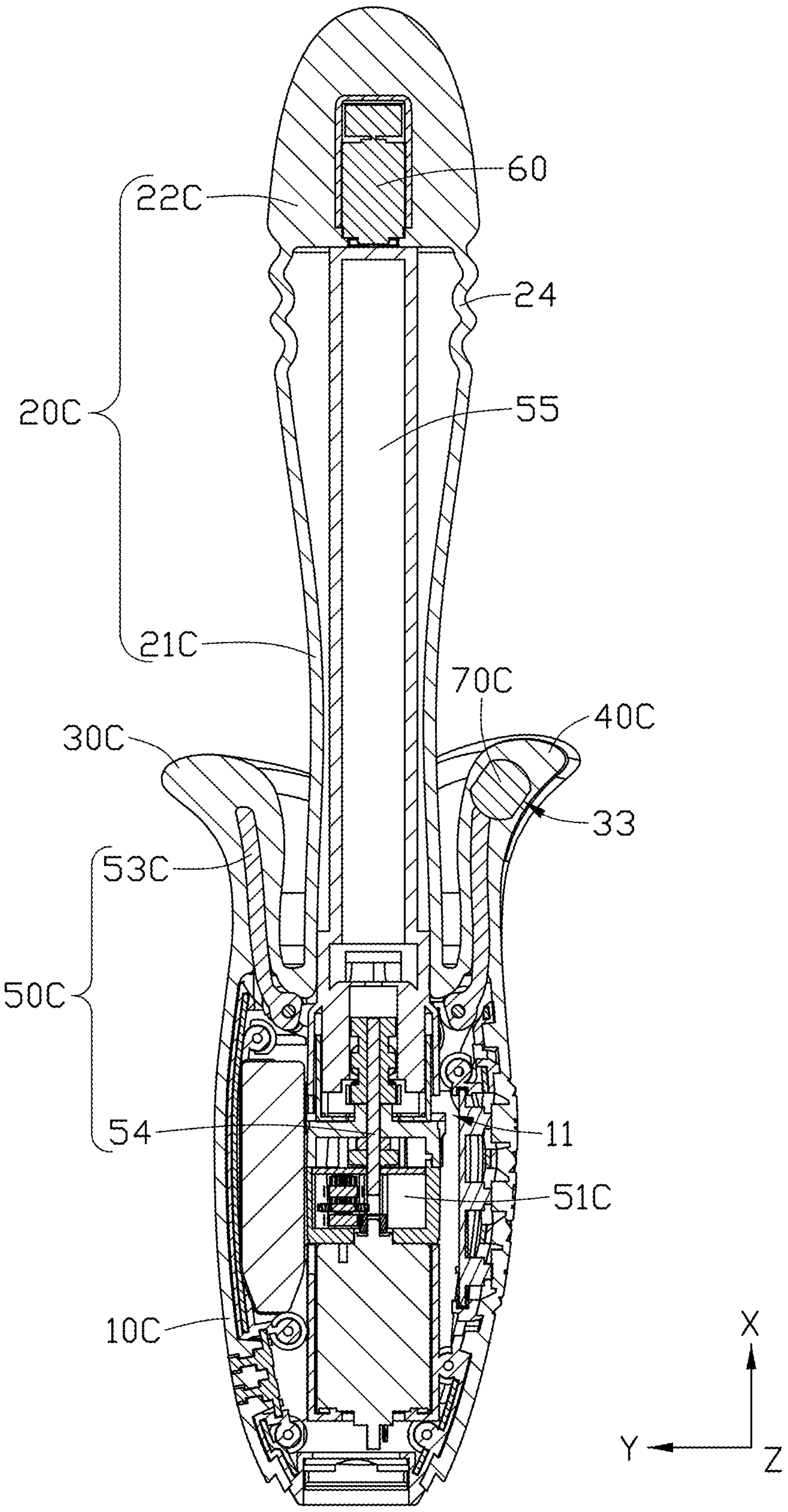
FIG. 18 is a sectional view of the sexual stimulation device shown in FIG. 15.

The fourth embodiment of the present disclosure will be illustrated below based on FIG. 15 to FIG. 16. In addition, for the convenience of illustration, the same reference numerals are marked for components with the same function as those described in the above embodiments, and their illustrations are omitted.

In the sexual stimulation device 100C of the present embodiment, the elongated arm 20C further comprises a non-linear portion 24C arranged between the first stimulation portion 22C and the connecting portion 21C of the elongated arm 20C and configured for providing necessary space for expansion and contraction movements of the elongated arm 20C.

In addition, the second stimulation portion 30C and the third stimulation portion 40C cooperatively form as an upper edge of one end of the main body 10C. The second stimulation portion 30C and the third stimulation portion 40C encircle the elongated arm 20C with most of the elongated arm 20C extending out of the he second stimulation portion 30C and the third stimulation portion 40C along the length direction of the elongated arm 20C. Each of the second stimulation portion 30C and the third stimulation portion 40C comprises a cavity 33, a second motor 70C is provided in the cavity 33 to drive the second/third stimulation portion 30C/40C to vibrate. In this way, the second stimulation section 30C and the third stimulation section 40C also have a vibration function while swinging, thereby obtaining better experience.

In the present embodiment, the second stimulation portion 30C and the third stimulation portion 40C are not separated with each other. The lateral edges of the second stimulation portion 30C are seamlessly connected with lateral edges of the third stimulation portion 40C. That is, the majority of both the second stimulation portion 30C and the third stimulation portion 40C are continuous, with only a minor portion being discrete. Only one second motor 70C is arranged to drive the vibrations of the second stimulation portion 30C and the third stimulation portion 40C.

In use, both of the second stimulation portion 30C and the third stimulation portion 40C move towards the elongated arm 20C at a certain time. Afterwards, both of the second stimulation portion 30C and the third stimulation portion 40C move away from the elongated arm 20C at another certain time. The second stimulation portion 30C and the third stimulation portion 40C thus may simulate movements of human's lips.

In the present embodiment, the driving mechanism 50C further includes a driving rod 54 and a connecting rod 55. The driving rod 54 is arranged in the first accommodating portion 11C and connected with the driving motor 51C. The connecting rod 55 extends into the elongated arm 20C to support the elongated arm 20C and control the contraction and expansion of the elongated arm 20C.

Fifth Embodiment

Figure 19:
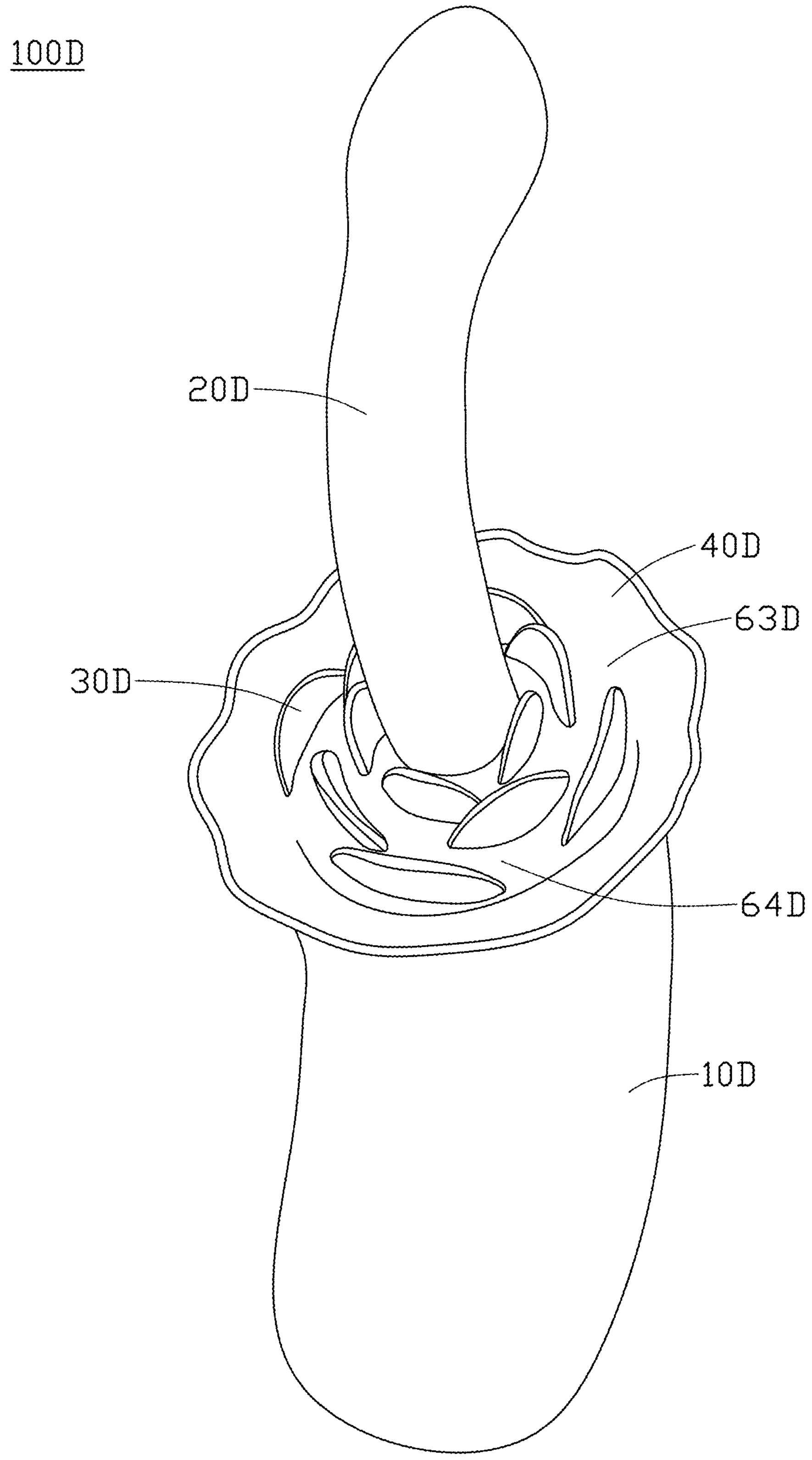
FIG. 19 is a three-dimensional structural diagram of a fifth embodiment of a sexual stimulation device according to the present disclosure.
Figure 20:
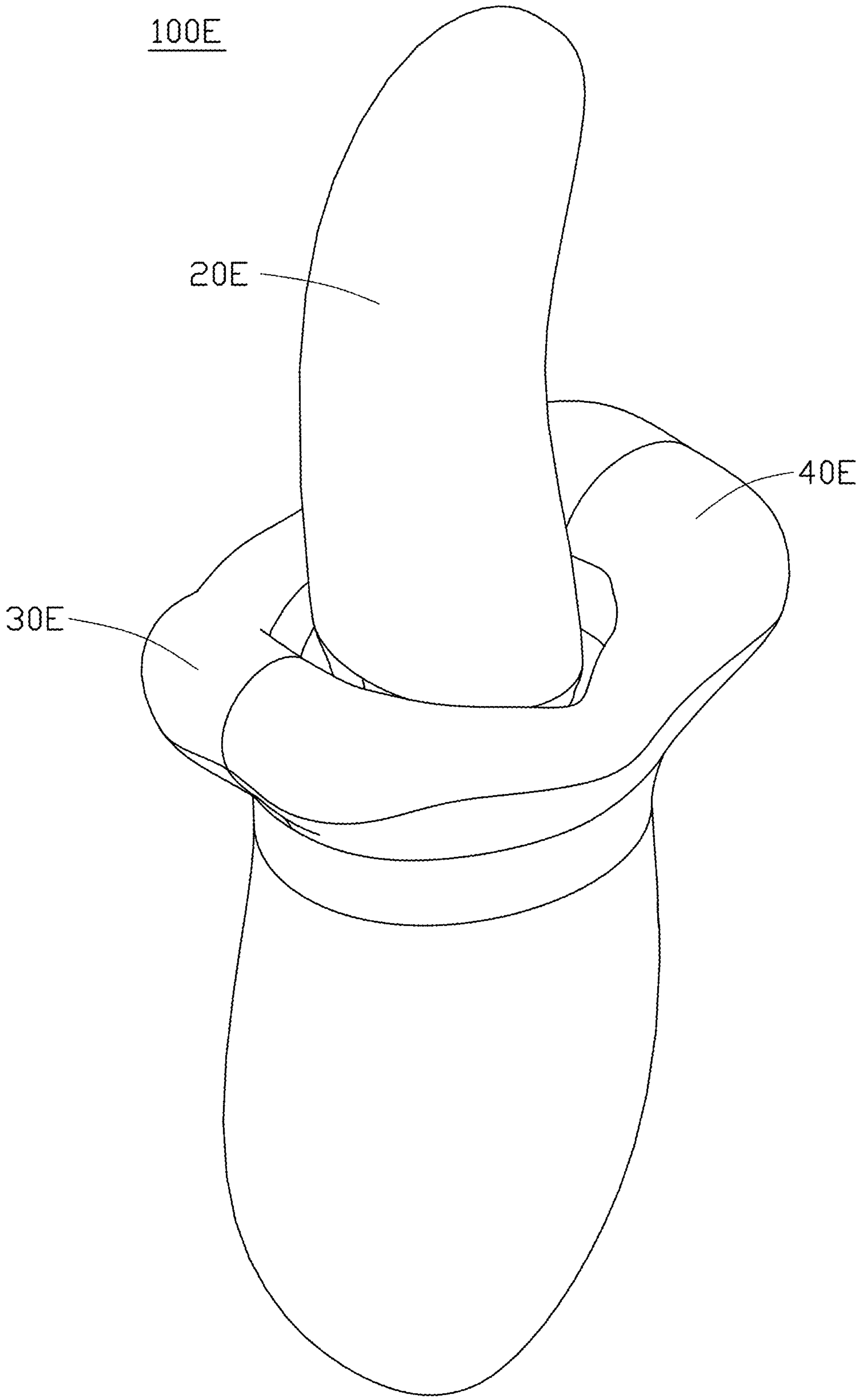
FIG. 20 is a three-dimensional structural diagram of a sixth embodiment of a sexual stimulation device according to the present disclosure.

The fifth embodiment of the present disclosure will be illustrated below based on FIG. 19. In addition, for the convenience of illustration, the same reference numerals are marked for components with the same function as those described in the above embodiments, and their illustrations are omitted.

In the present embodiment, the sexual stimulation device 100D includes a groove 63D defined at an end surface of the main body 10D. A plurality of stimulation portions 30D and the elongated arm 20D are arranged on a bottom wall 64D of the groove 63D. The plurality of stimulation portions 30D are arranged in a plurality circles. The stimulation portions 30D between adjacent circles offset to each other.

When the sexual stimulation device 100D is in operation, at least some of the plurality of stimulation portions 30D swing towards the elongated arm 20D at a certain time, and then move away from the elongated arm 20D at another certain time, such that the plurality of stimulation portions 30D can be contracted and expanded like petals.

In other embodiments, a plurality of stimulation portions 30D are capable of auto-rotation, vibration and performing other movements.

In addition, an end of the edge portion 63D away from the main body 10D is arranged in a non-linear manner, to improve aesthetics.

Sixth Embodiment

The sixth embodiment of the present disclosure will be illustrated below based on FIG. 20 to FIG. 25. In addition, for the convenience of illustration, the same reference numerals are marked for components with the same function as those described in the above embodiments, and their illustrations are omitted.

In the sexual stimulation device 100E of the present embodiment, the elongated arm 20E includes a connecting portion 21E and a first stimulation portion 22E connected to the connecting portion 21E.

In the present embodiment, the second stimulation portion 30E and the third stimulation portion 40E are provided spaced apart from the connecting portion 21E. When the elongated arm 20E swings along a first plane, the second stimulation portion 30E and the third stimulation portion 40E swing towards and spaced apart from the elongated arm 20E along a second plane which is perpendicular to the first plane.

In this embodiment, each of the second stimulation portion 30E and the third stimulation portion 40E includes a driver portion 55E, and details of the driver portions 55E will be described later.

Figure 21:
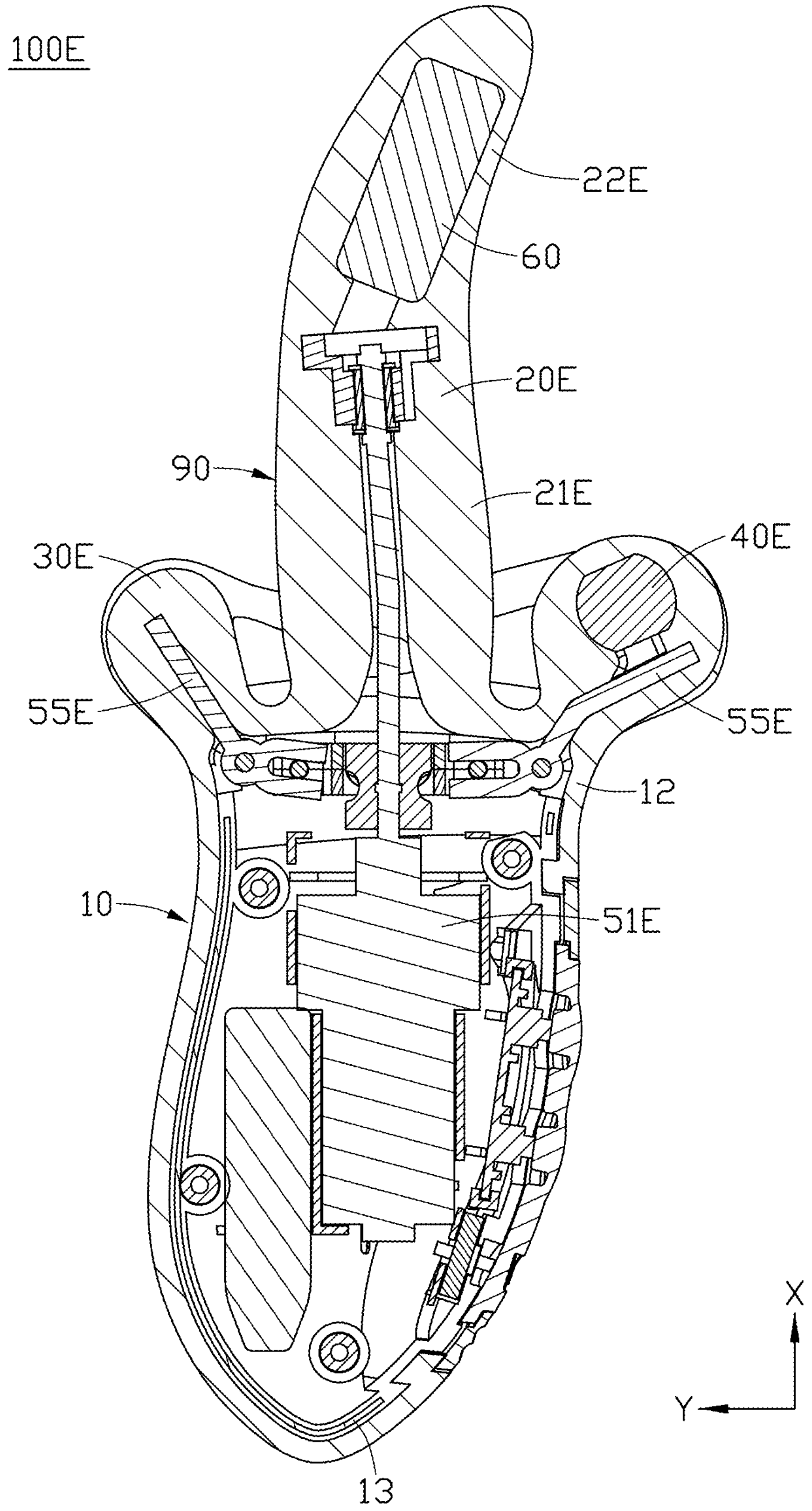
FIG. 21 is a sectional view of the sexual stimulation device shown in FIG. 20.
Figure 22:
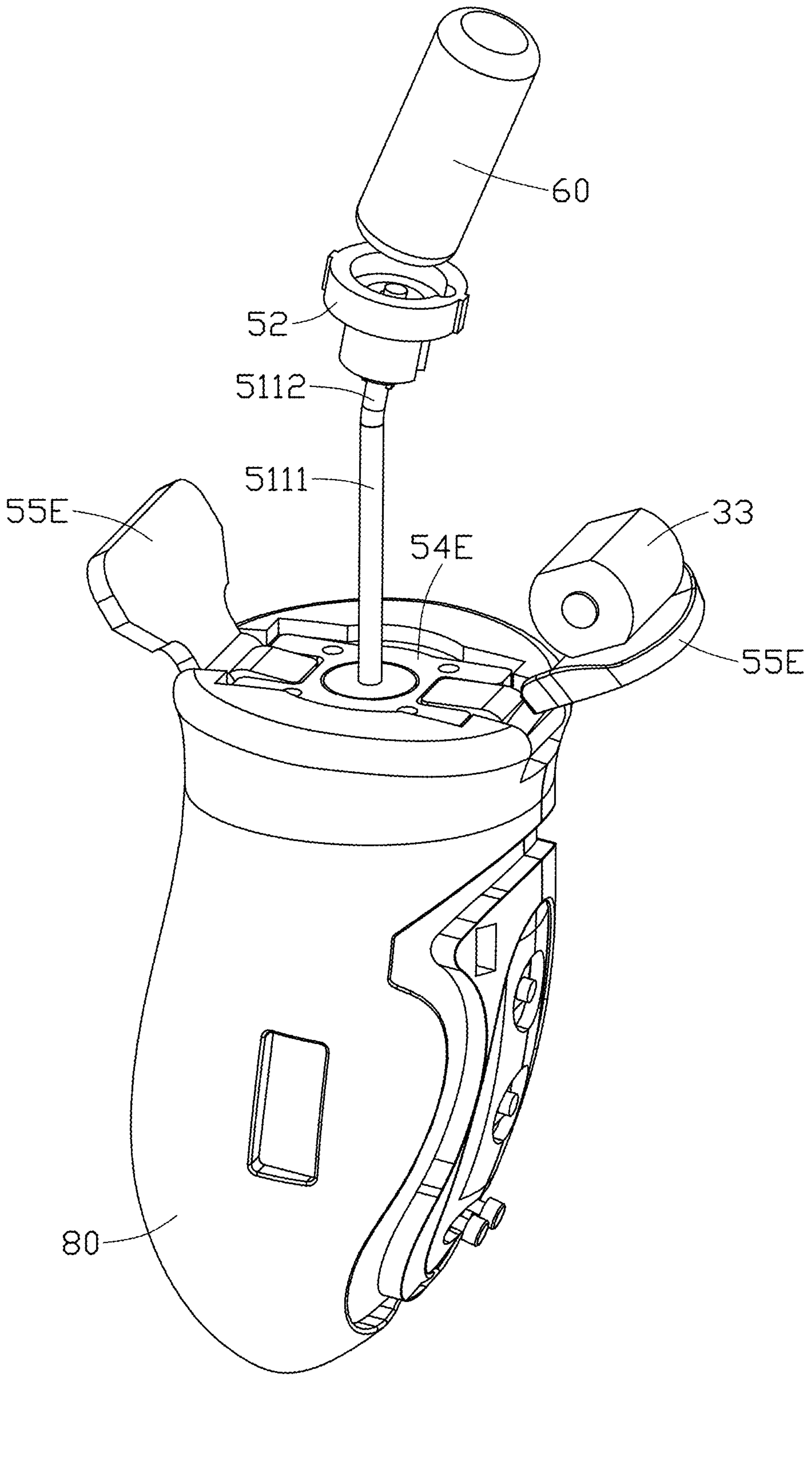
FIG. 22 is a three-dimensional structural diagram of the sexual stimulation device shown in FIG. 20, with a cover member being removed.
Figure 23:
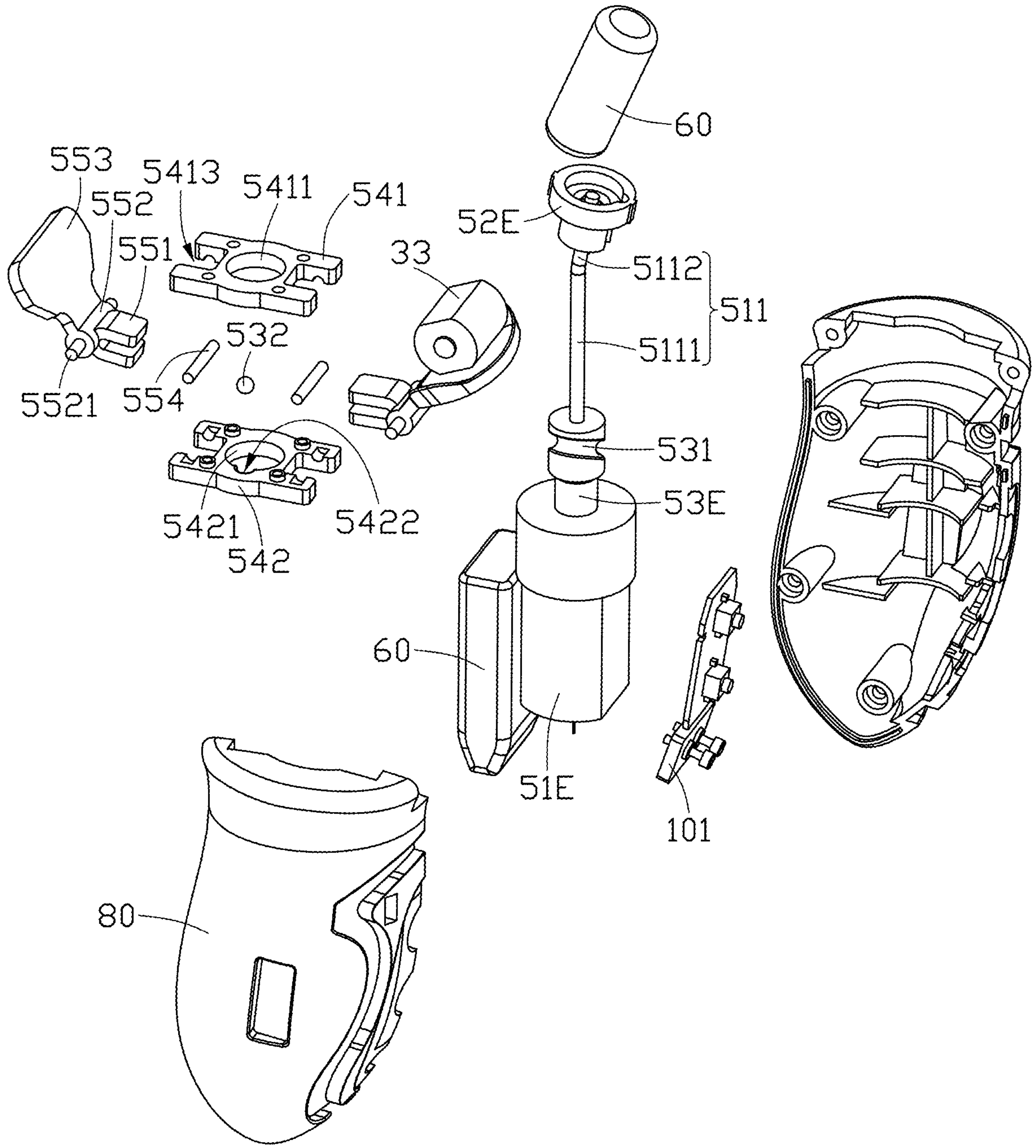
FIG. 23 is an exploded view of a partial structure of the sexual stimulation device shown in FIG. 22.
Figure 24:
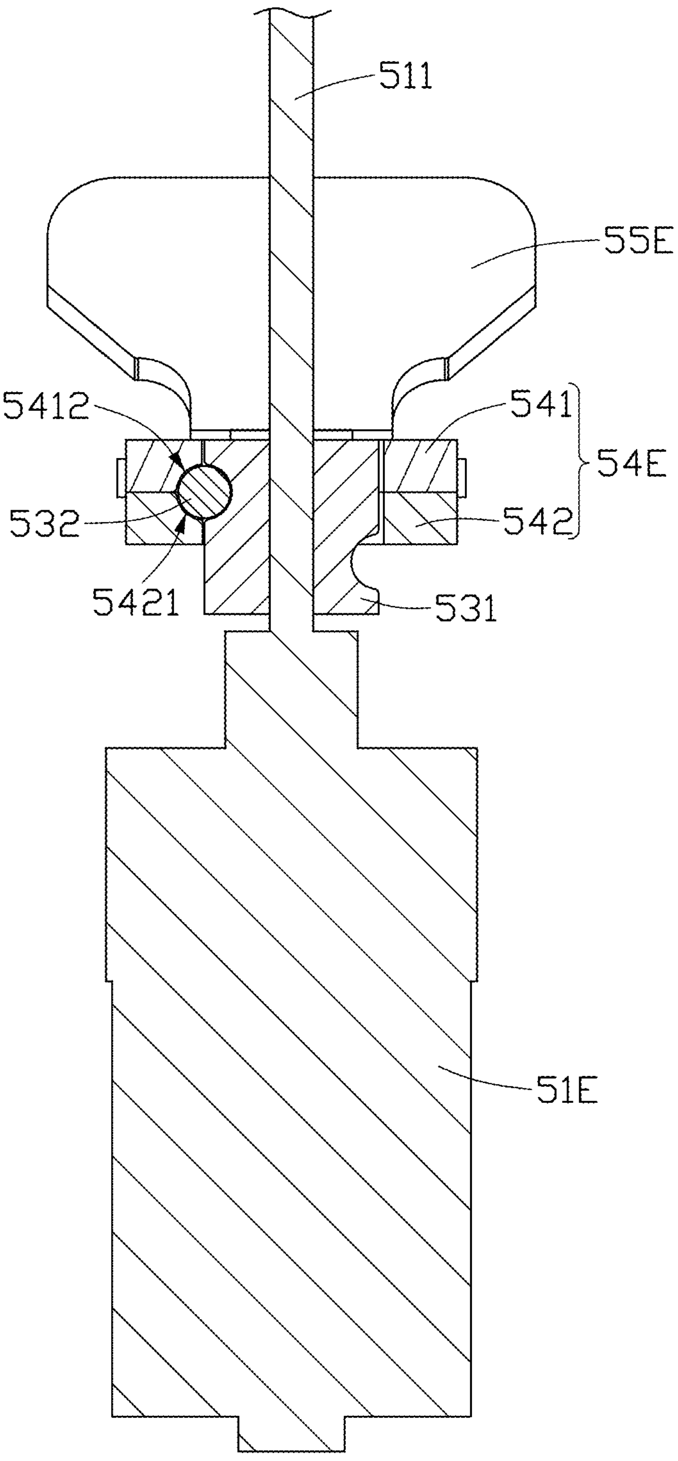
FIG. 24 is a partial sectional view of the sexual stimulation device shown in FIG. 23.
Figure 25:
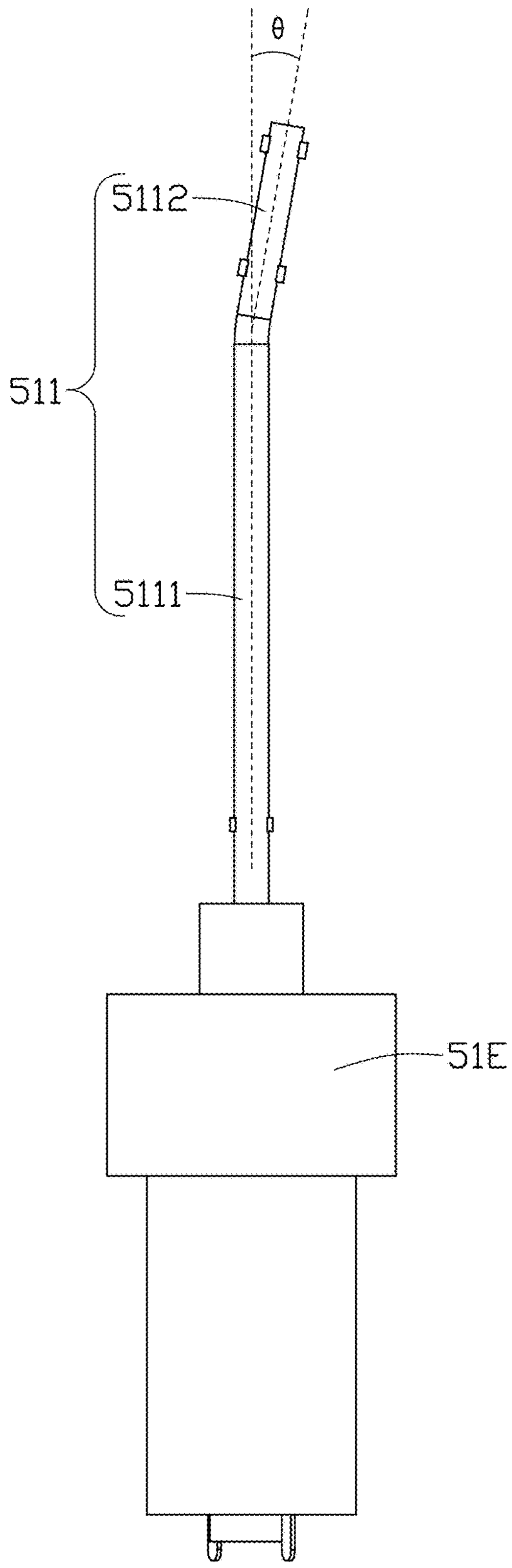
FIG. 25 is a partial enlarged view of the sexual stimulation device shown in FIG. 23.

Referring to FIG. 21 to FIG. 23, the driving mechanism 50E includes a driving motor 51E, a fixing portion 52E, a screw 53E, and a pushing assembly 54E.

The driving motor 51E includes a rotating shaft 511 extended from one end of the driving motor 51E along the longitudinal direction X of the sexual stimulation device 100E. The rotating shaft 511 can rotate under the drive of the driving motor 51E. The rotating shaft 511 includes a shaft portion 5111 and a bending portion 5112. The bending portion 5112 is provided at one end of the shaft portion 5111 away from the driving motor 51E and forms an included angle $\alpha$ with the shaft portion 5111 (see FIG. 25). Further, the angle $\alpha$ between the bending portion 5112 and the shaft portion 5111 is in a range from 3 degrees to 60 degrees, so that the first stimulation portion 22E is inclined at a predetermined angle relative to the connecting portion 21E, and rotates within a corresponding angle range, thereby facilitating control of the elongated arm 20E to swing within a preferable range.

The fixing portion 52E is fixedly disposed at an end of the bending portion 5112 away from the shaft portion 5111, and fixedly disposed in the elongated arm 20E, so as to drive the first stimulation portion 22E of the elongated arm 20E to rotate around the extending direction of the elongated arm 20E when the driving motor 51E drives the rotating shaft 511 to rotate.

In this embodiment, the bending portion 5112 forms the third included angle $\theta$ with the shaft portion 5111, and when the driving motor 51E is started, the rotating shaft 511 rotates and drives the bending portion 5112 to rotate and swing, the stimulation portion 22E can rotate and swing following the bending portion 5112.

The screw 53E is fastened at an end of the shaft portion 5111 adjacent to the driving motor 51E. An outer circumferential surface of the screw 53E is provided with a helical groove 531, and an abutting portion 532 is provided in the helical groove 531.

The pushing assembly 54E is movably arranged on the screw 53 and includes a first pusher 541 and a second pusher 542. The first pusher 541 includes a first through hole 5411 arranged at a substantially central portion thereof and a first recess 5412 (see FIG. 4) recessed from an inner wall of the first through hole 5411.

The second pusher 542 includes a second through hole 5421 and a second recess 5422 recessed from an inner wall of the second through hole 5421. The first through hole 5411 is aligned with the second through hole 5421 to form a through hole for a screw to pass therethrough. The first recess 5412 and the second recess 5422 cooperate to form a groove for accommodating the abutting portion 532 (see FIG. 4).

In this way, a part of the abutting portion 532 is accommodated in the groove, and another part of the abutting portion 532 is accommodated in the helical groove 531. Thus, when the driving motor 51 is started, the screw 53E rotates along with the rotation of the rotating shaft 511E, and the abutting portion 532 moves along the helical groove 531, simultaneously driving the pushing assembly 54E to reciprocate along a length direction of the screw 53.

An end of each driver portion 55E is rotatably connected to an end of the pushing assembly 54E, and another end of each driver portion 55E extends into the corresponding one of the second stimulation portion 30E and the third stimulation portion 40E.

Each driver portion 55E includes a first driver portion 551, an intermediate portion 552 and a second driver portion 553 which are arranged in sequence, and an obtuse angle is formed between the first driver portion 551 and the second driver portion 553. The first driver portion 551 is rotatably connected to the pushing assembly 54E by a connecting shaft 554. When the pushing assembly 54E moves towards the main body 10, the second driver portions 553 move towards the elongated arm 20E. When the pushing assembly 54E moves away from the main body 10, the second driver portions 553 move away from the elongated arm 20E and perform reciprocating swinging motion.

Both sides of the middle portion 552 are provided with a rotating shaft 5521, and each transmission 55E is rotatably arranged on the shell 80 by the rotating shaft 5521. Therefore, under the driving of the driving motor 51E, the second stimulation portion 30E and the third stimulation portion 40E can swing with the corresponding driver portion 55E, and the elongated arm 20E can perform swinging motion with the pushing assembly 54E.

Seventh Embodiment

Figure 26:
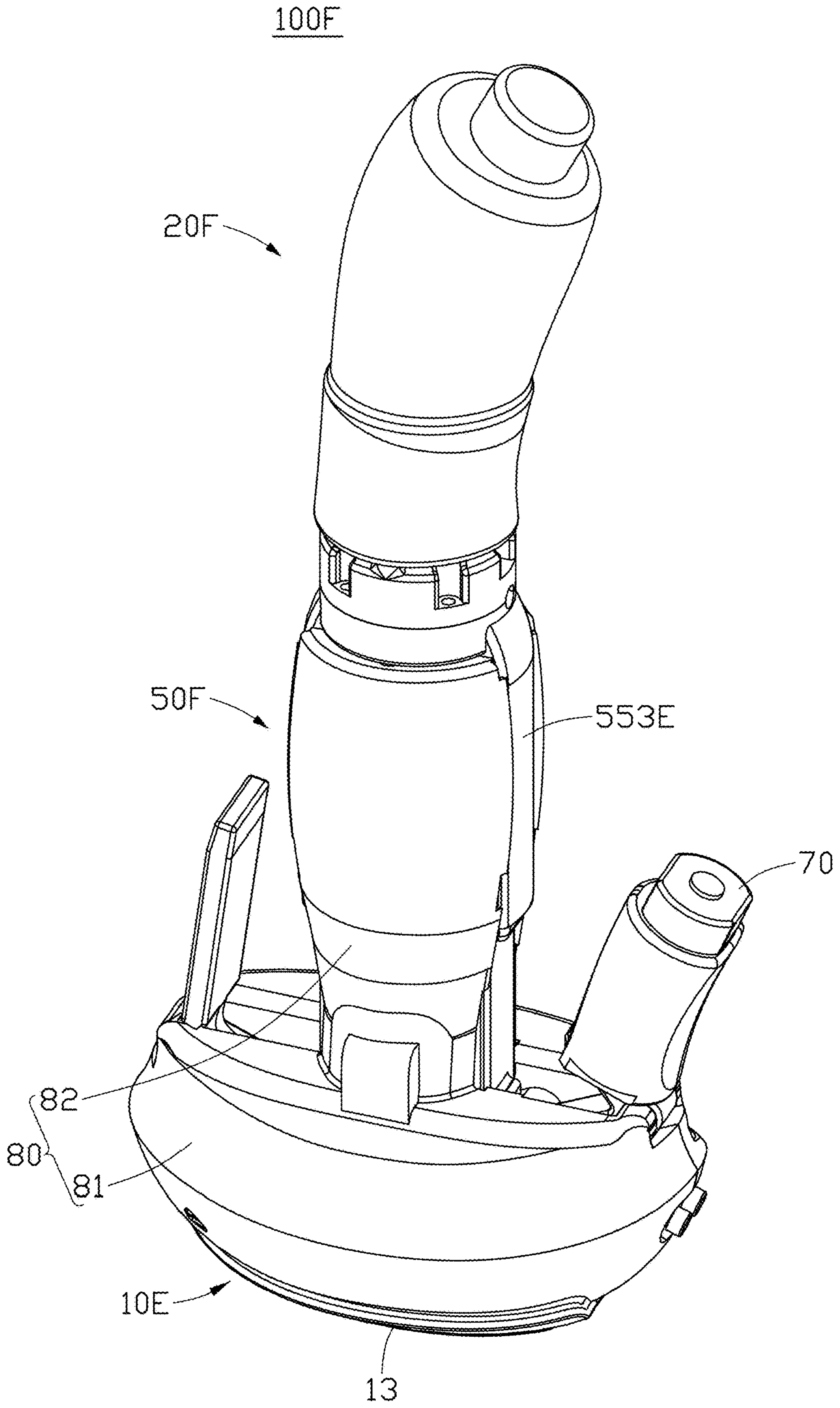
FIG. 26 is a three-dimensional structural diagram of a seventh embodiment of a sexual stimulation device with a cover member being removed according to the present disclosure.
Figure 27:
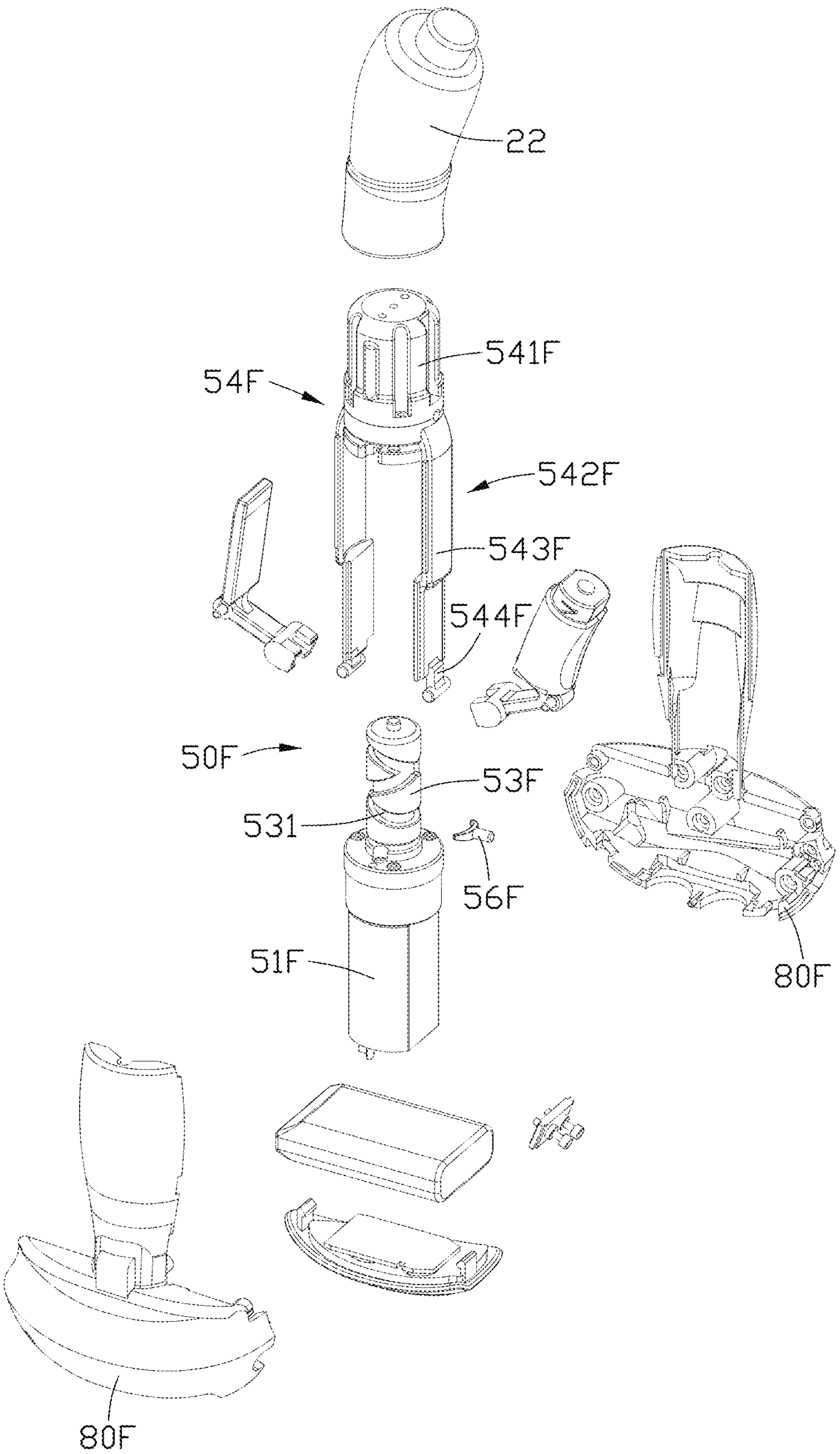
FIG. 27 is an exploded view of a partial structure of the sexual stimulation device shown in FIG. 26.
Figure 28:
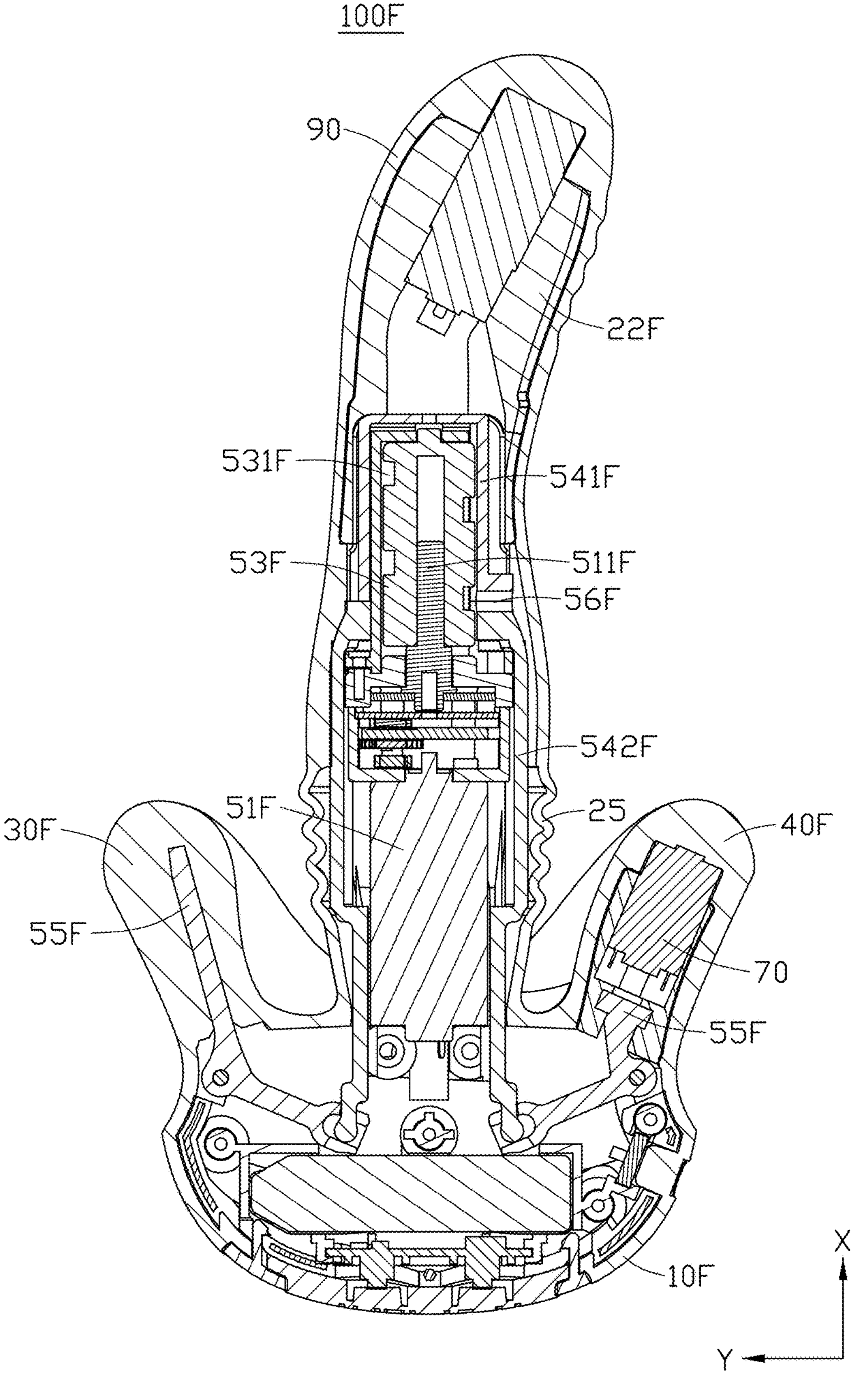
FIG. 28 is a sectional view of the sexual stimulation device shown in FIG. 26.

Referring to FIG. 26 to FIG. 28, the first stimulation portion 22F of the elongated arm 20F is movable telescopically with respect to the main body 10F in a longitudinal direction of the sexual stimulation device 100F under the driving of the driving mechanism 50F.

In this embodiment, the shell 80F has a T-shaped structure. The shell 80F includes a horizontal portion 81 and a vertical portion 82 perpendicular to the horizontal portion 81.

Referring to FIG. 27 to FIG. 28, the driving mechanism 50F is arranged in the vertical portion 82, and the driving mechanism 50F includes a driving motor 51F, a screw 53F, a pushing member 55F, and an abutting member 56F.

The driving motor 51F includes a rotating shaft 511F, and the rotating shaft 511F extends from an end of the driving motor 51F along the longitudinal direction X of the sexual stimulation device 100F and is capable of rotating under the action of the driving motor 51F.

In this embodiment, the driving motor 51F is a decelerating motor.

The screw 53F is fixedly disposed on the rotating shaft 511F and rotates along with rotation of the rotating shaft 511F. A spiral groove 531F is formed in an outer peripheral surface of the screw 53F.

The push assembly 54F is movably disposed on the screw 53F. Specifically, the push assembly 54F includes a first pusher 541F and two second pushers 542F.

The first pusher 541F is located at a side adjacent to the first stimulation portion 22F and sleeved on the screw 53F, and the first stimulation portion 22F is sleeved on the first pusher 541F and configured for pushing the first stimulation portion 22F of the elongated arm 20F to perform a telescopic movement relative to the connecting portion 21F. The two second pushers 542F extend from a peripheral edge of one side of the first pusher 541F away from the first stimulation portion 22F to the main body 10F. The two second pushers 542F are configured for surrounding the driving motor 51F and rotatably connected to the corresponding driver portions 57, respectively, so as to drive the second stimulation portion 30F and the third stimulation portion 40F to swing relative to the main body 10F.

In this embodiment, the second pushers 542F includes two pusher rods 543F, the two pusher rods 543F are configured to surround the driving motor 51F and rotatably connected to the corresponding driver portion 55F, respectively.

One end of the abutting member 56F is fixedly arranged on the first pushing member 551F, and the other end of the abutting member 56F is accommodated in the spiral groove 531. When the screw 53F rotates along with the rotation shaft 511F of the driving motor 51F, the abutting member 56F moves along the spiral groove 531, thereby driving the pushing member 55F to move in the extension direction of the screw 53F, so that the movement portion 22F can be driven to extend and retract.

In this embodiment, the elongated arm 20F further includes a pleat portion 25, the pleat portion 25 is arranged at the end of the elongated arm 20F adjacent to the main body 10F and configured for providing necessary space for expansion and contraction movements of the elongated arm 20F.

When the swing driving device 100F operates, the screw 53F rotates along with the rotation of the rotating shaft 511F, the abutting member 56F moves along the spiral groove 531 while driving the pushing member 55F to move along the lengthwise direction X of the sexual stimulation device 100F. When the push assembly 54F moves towards the elongated arm 20F, the elongated arm 20F is pushed to move in a direction away from the main body 10F. That is, the elongated arm 20F is in an extended state, and at this time, the second pushers 542F are also moved towards the first stimulation portion 22F, the driver portion 55 moves away from elongated arm 20F. When the push assembly 54F moves towards the main body 10F, the elongated arm 20F is pulled to move towards the main body 10F, that is, the telescopic portion 20F is retracted, and at this time, the second pushers 542F move away from the elongated arm 20F. When the elongated arm 20F performs the reciprocating telescopic movement, the second stimulation portion 30F and the third stimulation portion 40F swings reciprocally, thereby realizing the meshing movement.

What is claimed is:

1. A sexual stimulation device comprising:

a main body;

an elongated arm configured to be placed in a vagina, the elongated arm connected to the main body and a first stimulation portion arranged at a distal end of the elongated arm away from the main body, the first stimulation portion configured for stimulating a first region;

a second stimulation portion arranged at a left side of the elongated arm, wherein the second stimulation portion is capable of being placed in the vagina and configured for swinging reciprocally between a first position and a second position so as to stimulate a second region, the second region being different from the first region, the first position is at a front side of the elongated arm, the second position is at a rear side of the elongated arm; and a third stimulation portion arranged at a right side of the elongated arm, wherein the third stimulation portion is capable of being placed in the vagina and configured for swinging reciprocally between a third position and a fourth position so as to stimulate a third region, the third region being different from the first stimulation region and the second stimulating region, the third position is at the front side of the elongated arm and opposite to the first position, the fourth position is at the rear side of the elongated arm and opposite to the second position; and a driving mechanism comprising at least one driving motor configured for driving the second stimulation portion and the third stimulation portion to swing reciprocally, wherein the elongated arm, the second stimulation portion and the third stimulation portion are directly coupled to a same end of the main body and arranged along an arrange line which is parallel to a lateral direction of the sexual stimulation device, wherein the second stimulation portion, the elongated arm and the third stimulation portion at least partially overlap with one other in the lateral direction of the sexual stimulation device, while at least a part of the second stimulation portion, the elongated arm and the third stimulation portion are spaced from one another at a direction which is orthogonal to the arrange line, and wherein the elongated arm is swingable in a first swing plane perpendicular to the arrange line, the second stimulation portion is configured to swing in a second swing plane which is obliquely intersected to the first swing plane, the third stimulation portion is configured to swing in a third swing plane which is obliquely intersected to the first swing plane.

2. The sexual stimulation device according to claim 1, wherein a first included angle defined by the first swing plane and the second swing plane ranges from greater than zero (0) degrees and no more than 60 degrees, a second included angle defined by the first swing plane and the third swing plane ranges from greater than zero (0) degrees and no more than 60 degrees, a third included angle defined by the second swing plane and the third swing plane ranges from greater than zero (0) degrees and no more than 90 degrees.

3. The sexual stimulation device according to claim 1, wherein the elongated arm comprises a neck portion coupled to the main body, a width of the neck portion is smaller than a width of the first stimulation portion, the neck portion comprising two concave portions at on opposite sides of the neck portion, and the second stimulation portion and the third stimulation portion are disposed beside the two concave portions.

4. The sexual stimulation device according to claim 3, wherein the sexual stimulation device is switchable between an original state and a pressed state, wherein in the pressed state, the second stimulation portion and the third stimulation portion are pressed towards corresponding concave portions of the two concave portions.

5. The sexual stimulation device according to claim 4, wherein in the original state, a maximum lateral width from the second stimulation portion to the third stimulation portion is larger than the width of the first stimulation portion, and in the pressed state, the maximum lateral width from the second stimulation portion to the third stimulation portion is substantially equal to the width of the first stimulation portion.

6. The sexual stimulation device according to claim 1, wherein the sexual stimulation device further comprises a control circuit arranged in the main body, the control circuit is configured to cause the sexual stimulation device to be in a first control mode or in a second control mode, wherein:

in the first control mode, the second stimulation portion and the third stimulation portion swing at a same frequency in a same swing direction for a preset time period; and in the second control mode, the second stimulation portion and the third stimulation portion swing at a same frequency in opposite swing directions for a preset time period.

7. The sexual stimulation device according to claim 1, wherein each of the second stimulation portion and the third stimulation portion comprises a connecting end connecting with the main body and a distal end away from the main body, the distal end is rotatable around a central axis of the second stimulation portion or the third stimulation portion.

8. The sexual stimulation device according to claim 1, wherein each of the second stimulation portion and the third stimulation portion comprises a connecting end connecting with the main body and a distal end further away from the main body than the connecting end, at least one corresponding distal end of the second stimulation portion and the third stimulation portion comprises a vibration motor, the vibration motor is configured to drive the corresponding distal end to vibrate.

9. The sexual stimulation device according to claim 1, wherein the driving mechanism further comprises a transmission configured for changing rotation speeds of the driving motor, and two driver portions arranged inside the main body, the at least one driving motor is connected to the transmission, the two driver portions are configured to drive a corresponding stimulation portion of the second, and the third stimulation portions such that the second, and the third stimulation portions are driven to swing by the at least one driving motor, one end of each of the two driver portions engages with the transmission, and another end of each of the two driver portions engages with the corresponding stimulation portion.

10. The sexual stimulation device according to claim 9, wherein each of the second stimulation portion and the third stimulation portion comprises a cover member having a hardness less than a portion of the driving mechanism which is connected to the second stimulation portion and the third stimulation portion.

11. The sexual stimulation device according to claim 1, wherein the first stimulation portion of the elongated arm is movable telescopically with respect to the main body in a longitudinal direction of the sexual stimulation device.

* * * * *